United States Patent
Smith et al.

(10) Patent No.: US 8,274,377 B2
(45) Date of Patent: Sep. 25, 2012

(54) INFORMATION COLLECTING AND DECISION MAKING VIA TIERED INFORMATION NETWORK SYSTEMS

(75) Inventors: Richard A. Smith, San Diego, CA (US); James M. Colthart, Poway, CA (US); Gary E. Scoggins, Issaquah, WA (US); David C. Vineyard, Coronado, CA (US); Lance D. Loesberg, Irving, TX (US); David C. Klugh, Black Diamond, WA (US); Joe T. Marcelino, San Diego, CA (US); Steven K. Sharp, San Diego, CA (US); Tim D. McGinn, San Diego, CA (US); Richard G. Warren, San Diego, CA (US); Peter T. Rosti, Del Mar, CA (US); Michael D. Ramage, Seattle, WA (US); James M. Stephenson, Maple Valley, WA (US); Michael Livingston, San Diego, CA (US)

(73) Assignee: Decision Sciences International Corporation, Poway, CA (US)

( * ) Notice: Subject to any disclaimer, the term of this patent is extended or adjusted under 35 U.S.C. 154(b) by 1047 days.

(21) Appl. No.: 11/972,599

(22) Filed: Jan. 10, 2008

(65) Prior Publication Data
US 2008/0258880 A1    Oct. 23, 2008

Related U.S. Application Data

(60) Provisional application No. 60/879,949, filed on Jan. 10, 2007.

(51) Int. Cl.
G08B 9/00    (2006.01)
(52) U.S. Cl. .................. 340/286.02; 340/506; 340/507; 700/3; 700/82

(58) Field of Classification Search .................. 340/506, 340/507, 508, 511, 825.35, 825.49; 700/3, 700/82
See application file for complete search history.

(56) References Cited

U.S. PATENT DOCUMENTS 5,400,246 A * 3/1995 Wilson et al. .................. 700/17
(Continued)

FOREIGN PATENT DOCUMENTS

| WO | W02008118209 A2 | 10/2008 |
| WO | W02008123892 A2 | 10/2008 |
| WO | WO2008118208 A2 | 10/2008 |
| WO | W02008140559 A2 | 11/2008 |
| WO | W02008140560 A2 | 11/2008 |

OTHER PUBLICATIONS

Frühwirth, R., "Application of Kalman filtering to track and vertex fitting," Nuclear Instruments and Methods in Physics Research Section A, 262(2-3):444-450, Dec. 1987.
(Continued)

Primary Examiner — Daryl Pope
(74) Attorney, Agent, or Firm — Perkins Coie LLP

(57) ABSTRACT

Techniques, apparatus and systems for information collecting and decision making based on one or more tiered networks of sensors and communication nodes for security monitoring and warning, disaster warning, counter-terrorism, and other applications associated with information collecting and decision making. In implementations, the one or more tier networks in the plurality of different tier networks include network nodes at roadway intersections; the sensors include automatic license plate recognition sensors to obtain data on vehicle license plates; and the response produced by the processing mechanism includes controlling traffic controllers to alter traffic routes at one or more locations. In other implementations, each command center in a tier network comprises a database to store data, a situation awareness module to provide event detection, event forecasting, assessment and response, an analytic module to analyze data characteristics, and a communication module to provide communications with adjacent subordinate and superordinate tier networks.

73 Claims, 25 Drawing Sheets

U.S. PATENT DOCUMENTS

| | | | |
|---|---|---|---|
| 5,732,158 | A | 3/1998 | Jaenisch |
| 6,061,600 | A * | 5/2000 | Ying .................... 700/3 |
| 6,169,476 | B1 | 1/2001 | Flanagan |
| 6,930,596 | B2 | 8/2005 | Kulesz et al. |
| 7,119,676 | B1 | 10/2006 | Silverstrim et al. |
| 7,327,913 | B2 | 2/2008 | Shpantzer et al. |
| 7,426,035 | B2 | 9/2008 | Shpantzer |
| 7,470,905 | B1 | 12/2008 | Goldberg et al. |
| 7,483,600 | B2 | 1/2009 | Achiam et al. |
| 7,488,934 | B2 | 2/2009 | Bryman |
| 7,502,118 | B2 | 3/2009 | Shpantzer |
| 7,531,791 | B2 | 5/2009 | Bryman |
| 7,652,254 | B2 | 1/2010 | Shpantzer et al. |
| 7,724,778 | B2 * | 5/2010 | Ying ...................... 370/489 |
| 2004/0008719 | A1 * | 1/2004 | Ying ...................... 370/460 |
| 2004/0008721 | A1 * | 1/2004 | Ying et al. ............... 370/460 |
| 2004/0096143 | A1 | 5/2004 | Shpantzer et al. |
| 2005/0088299 | A1 | 4/2005 | Bandy et al. |
| 2006/0002368 | A1 | 1/2006 | Budampati et al. |
| 2006/0171329 | A1 * | 8/2006 | Ying ...................... 370/254 |
| 2006/0173857 | A1 * | 8/2006 | Jackson .................... 707/10 |
| 2006/0180753 | A1 | 8/2006 | Bryman |
| 2007/0102648 | A1 | 5/2007 | Shpantzer et al. |
| 2007/0115475 | A1 | 5/2007 | Shpantzer |
| 2007/0127030 | A1 | 6/2007 | Shpantzer |
| 2007/0133918 | A1 | 6/2007 | Cho et al. |
| 2007/0140613 | A1 | 6/2007 | Achiam et al. |
| 2008/0025728 | A1 | 1/2008 | Shpantzer et al. |
| 2008/0128604 | A1 | 6/2008 | Bryman |
| 2008/0159758 | A1 | 7/2008 | Shpantzer et al. |
| 2008/0212970 | A1 | 9/2008 | Shpantzer |
| 2008/0315091 | A1 | 12/2008 | Morris et al. |
| 2009/0224157 | A1 | 9/2009 | Goldberg et al. |
| 2009/0295576 | A1 | 12/2009 | Shpantzer et al. |
| 2010/0065745 | A1 | 3/2010 | Goldberg et al. |

OTHER PUBLICATIONS

Hardin, W., "Muon imager searches for smuggled nuclear material," Proceedings of SPIE, the International Society for Optical Engineering, 3(9):5-6, Sep. 2003.

Jaenisch, H.M., et al., "Data Modeling for Defense Planning," Society for Computer Simulation (Huntsville Simulation Conference 2003), Huntsville, AL, 6 pages, Oct. 30-31, 2003.

Jaenisch, H.M., et al., "Data Modeling for Radar Applications," Proceedings of IEEE Radar Conference, pp. 379-386, May 2003.

Jaenisch, H.M., et al., "Enabling Human HUMS with Data Modeling," Proc. SPIE—Defense and Security Symposium, 12 pages, Apr. 2006.

Jaenisch, H.M, et al., "Enabling Unattended Data Logging and Publication by Data Model Change Detection and Environmental Awareness," Proc. SPIE—Defense and Security Symposium, vol. 6231, 62310R, 11 pages, Apr. 2006.

Jaenisch, H.M, et al., "Muon Imaging and Data Modeling," Proceedings of SPIE, the International Society for Optical Engineering, 6538(85):1-8, Apr. 2007.

Jaenisch, H.M, et al., "A Simple Algorithm for Sensor Fusion Using Spatial Voting (Unsupervised Object Grouping)," Proceedings of SPIE—Defense and Security Symposium, 6968(68):696804.1-696804.12, Mar. 2008.

Jenneson, P.M., "Large Vessel Imaging Using Cosmic-Ray Muons," Nuclear Instruments and Methods in Physics Research A, 525(1-2):346-351, Jun. 2004.

Pooley, J., et al., "Fault Detection via Complex Hybrid Signature Analysis," JANNAF 39th Combustion, 27th Airbreathing Propulsion, 21st Propulsion Systems Hazards, and 3rd Modeling and Simulation Subcommittees Joint Meeting, Colorado Springs, CO, 11 pages, Dec. 2003.

Priedhorsky, W.C., et al., "Detection of High-Z Objects Using Multiple Scattering of Cosmic Ray Muons," Review of Scientific Instruments, 74(10):4294-4297, Oct. 2003.

Schultz, L., et al., "Statistical Reconstruction for Cosmic Ray Muon Tomography," IEEE Transactions on Image Processing, 16(8):1985-1993, Aug. 2007.

International Search Report and Written Opinion dated Jun. 18, 2008 for International Application No. PCT/US2008/050819, filed Jan. 10, 2008 (7 pages).

International Preliminary Report on Patentability dated Jul. 14, 2009 for International Application No. PCT/US2008/050819, filed Jan. 10, 2008 (5 pages).

* cited by examiner

INFORMATION COLLECTING AND DECISION MAKING VIA TIERED INFORMATION NETWORK SYSTEMS

PRIORITY CLAIM AND RELATED APPLICATION

This application claims the benefit of U.S. Provisional Patent Application No. 60/879,949 entitled "Security Network" and filed on Jan. 10, 2007, the entire disclosure of which is incorporated by reference as part of the specification of this application.

BACKGROUND

This application relates to information collecting and decision making based on networks of sensors and communication nodes and applications in security monitoring, security warning, counter-terrorism, and other applications associated with information collecting and decision making.

Various detectors or sensors can be used to obtain information from targets and such data collection from targets can be automated by using computers and computer networks to store data from the detectors or sensors and to analyze the data from the detectors and sensors to make decisions. Examples of such automated data collection, processing and analysis systems, among others, include computer-based warning systems for generating early or timely warnings of natural and man-made disasters or hazardous events in various applications including security and counter-terrorism applications.

Some warning systems may require human intervention to either perform the threat analysis or to recognize when a significant threat is presented and to initiate the warning. For example, the tsunami early warning system is one such system. In that system, seismic information is collected and sent to a hub for processing. The information is analyzed to determine the likelihood of tsunami generation. If there is a high probability of tsunami generation, a warning is issued to local, state, national and international users as well as the media. These users, in turn, disseminate the tsunami information to the public, generally over commercial radio and television channels. Next, sea level data is gathered and analyzed to determine the presence of an actual tsunami. If a tsunami is detected, the warning area may be enlarged. Such a system relies upon central data analysis and human intervention for providing the warning as a result, the processing of large amounts of data is limited because its reliance on the central hub and human analysis.

In another example, a tornado warning system combines data from various sources and human decision making to trigger outdoor sirens. The system partners the National Weather Service, local emergency response agencies, and major industries to provide the necessary communication and coordination. A major source of data in the system is a network of trained volunteer storm spotters and Ham Radio operators. These groups all work together to make up an integrated system of hazard detection, consequence prediction, and warning dissemination. National Weather Service meteorologists use information from weather radar as well as the network of trained spotters to issue severe weather warnings.

Attempts have been made to increase automation of such warning systems by using computer processing and communication networks. Examples of such systems are described in U.S. Pat. No. 6,169,476 entitled "early warning system for natural and manmade disasters" and issued to Flanagan and U.S. Pat. No. 6,930,596 entitled "system for detection of hazardous events" and issued to Kulesz et al.

SUMMARY

This application describes, among others, techniques, apparatus and systems for information collecting and decision making based on networks of sensors and communication nodes for security monitoring and warning, disaster warning, counter-terrorism, and other applications associated with information collecting and decision making.

In one aspect, a network system for collecting information from sensors described in this document includes a plurality of different tier networks in communication with one another. Each tier network comprises a plurality of network nodes one of which is configured as a command center of the tier network to collect data from other network nodes within the tier network and to direct the collected data to a center node of a superordinate tier network. The different tier networks are configured to perform different and tier-specific data collection and data processing tasks and at least one tier network being located within a superordinate tier network. This system includes a plurality of sensors spatially distributed in the different tier networks to perform sensing measurements, each sensor in communication with a respective network node to direct data of sensing measurements to the respective network node.

In another aspect, a network system for collecting information from sensors described in this document includes a plurality of sensors spatially distributed in a region of interest to perform sensing measurements; a plurality of sensor communication nodes, each sensor communication node in communication with at least one of the sensors to receive data from the at least one sensor; communication links that link the sensor communication nodes into a plurality of tier networks of sensor communication nodes based on geographic location attributes and non-geographic location attributes, the plurality of tier networks being configured to perform different data collection and data processing tasks based on the tier network attributes; and a processing mechanism to distribute data processing to the plurality of tier networks and to produce a response based on the distributed data processing.

In another aspect, a method for using a security network described in this document includes embedding threat detection software in a plurality of roadway traffic signal controllers; coupling at least one threat detection sensor to a corresponding roadway traffic signal controller; and monitoring output of the at least one threat detection sensor by the corresponding roadway traffic signal controller.

In yet another aspect, a security network described in this document includes a plurality of second tier networks, a plurality of third tier networks; and a plurality of fourth tier networks. At least one of the second tier networks comprises a plurality of fourth tier networks, and each network is assigned tasks corresponding to the tier.

These and other implementations and their variations are described in detail in the attached drawings, the detailed description and the claims.

DETAILED DESCRIPTION

Figure 1:
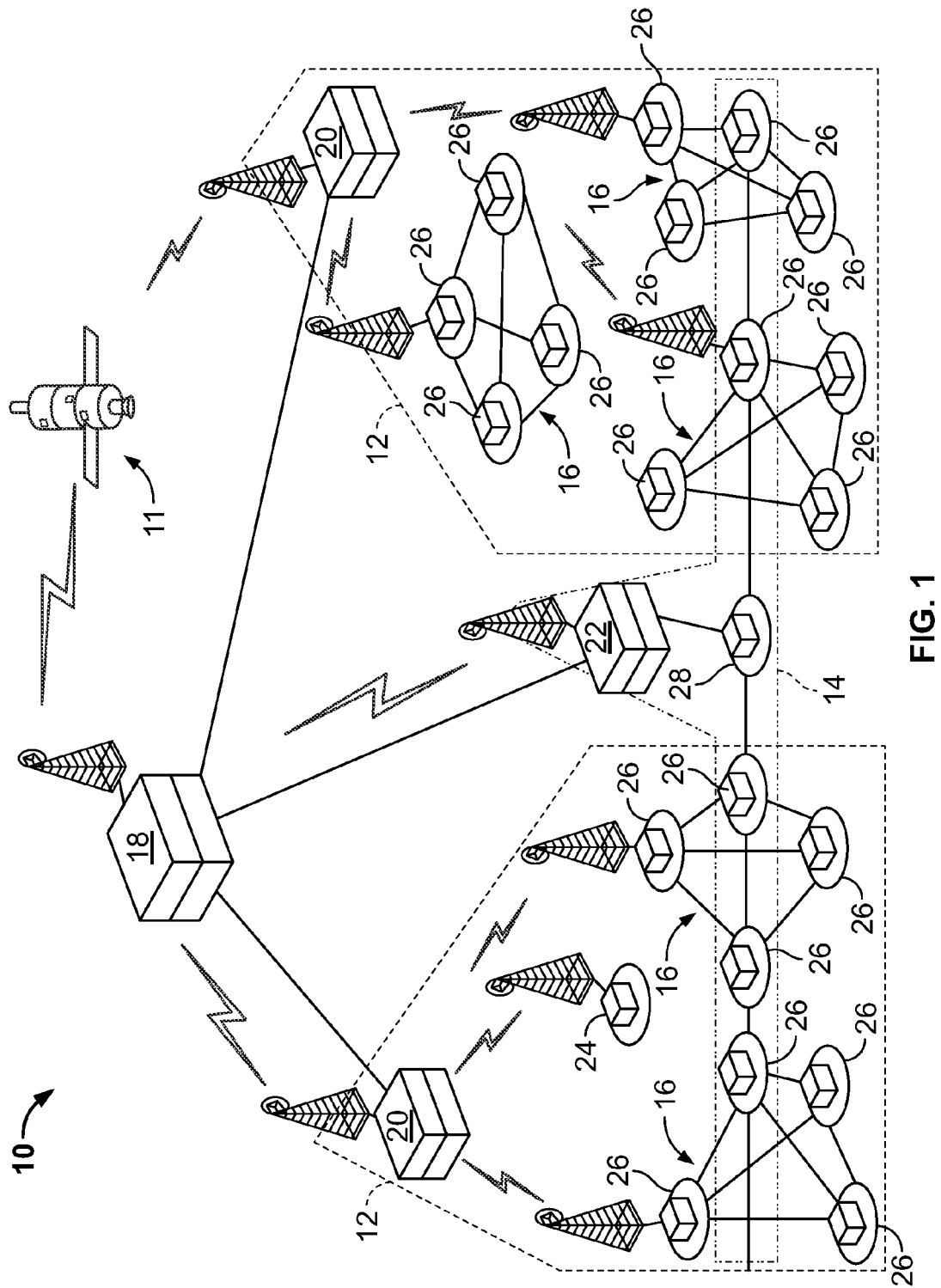
FIG. 1 is a schematic of an example of a multi-tier security network.

Examples and implementations of techniques, apparatus and systems for information collecting and decision making based on networks of sensors and communication nodes in this document can be used in various applications including security monitoring and warning, disaster warning, counter-terrorism, and other applications associated with information collecting and decision making. Specific examples of multi-tier sub-network structures for data collection, processing and analysis and tier-based task allocation are described below in the context of security networks and various technical features in these specific examples can be applied to a wide range applications related to data collection and decision making beyond security networks.

The security network examples described below can be used to provide national situation awareness, including threat detection and event forecasting, assessment and response. Such a security network is a network of distributed multi-tier sub-networks. The network is defined either comprehensively or in terms of its individual components and their integration. The network components may provide the ability to integrate and apply decision logic as a function of data received by either individual, combined, agnostic or specifically tailored sensor devices or systems. Additionally, the network components provide the ability to cross correlate this information to a database and/or between databases of pertinent information relative to the suspected threat in order to verify and broaden the understanding of its scope. Components of the system may include notification and strategic response protocols, both generic and idiosyncratic to the protected area. Additionally, components of the system can include interfaces for integration with existing sensors, sensor networks, data fusion systems and analytics modules. This integration with existing infrastructure provides additional situational awareness by utilizing existing assets.

The sub-networks are organized on tiers in which each tier is assigned processing tasks specific for the tier. The distribution of tier-based tasks allows for data overlap, cross-pollination, comparison, and certainty testing of collected information and performed analyses. The sub-networks are also capable of peer-to-peer communication regardless of the tier hierarchy and data aggregation that allows the system to draw determinant conclusions. Although the network is primarily based on the tier-based task distribution, in certain embodiments, the task distribution also correlates to a geographically organized tier structure.

In one implementation, the security network forms a first tier and includes a plurality of second tier networks, a plurality of third tier networks, and a plurality of fourth tier networks. This tiered structure provides a subordinate-superordinate relationship of different tiers where the fourth tier network is the most subordinate network and the first tier network is the most superordinate network. The scope of the functions of a subordinate network can be partially or completely encompassed by the scope of functions of a superordinate network. Each tier network includes network nodes one of which is configured as a command center of the tier network to collect data from other network nodes within the tier network and to direct the collected data to a center node of a superordinate tier network. The different tier networks are configured to perform different and tier-specific data collection and data processing tasks. In one implementation, at least one tier network is located within a superordinate tier network where network nodes of the tier network are network nodes of the superordinate tier network. Two different tier networks may share one or more common network nodes while other network nodes in the two networks are different.

In some applications including security networks, the tier structure may be organized by geographic locations. The second tier networks may be regional networks. The third tier networks may be corridor networks corresponding to interstate thoroughfares or other geographic regions. The fourth tier networks may be local networks, such as a towns, downtowns, neighborhoods, or specific target locations such as reservoirs and sports stadiums. Components of networks may overlap, for example, a component of a regional network may also be a component of a corridor network so that communication handoff is simplified. Sensors can be provided in the networks to collect various data to be stored in the security network for data processing, data analysis and decision making. In a sub network covering roadways, road traffic controllers can be used to provide processing for the stations that form the sub-networks. In other implementations, sensors such as cameras, cargo detectors and other sensing devices may be used.

An example for providing a security network is provided that utilizes road traffic controllers as one component. The method includes embedding threat detection software in a network of roadway traffic controllers. At least one threat detection sensor, such as chemical, biological, radiological, nuclear and/or explosive detection sensors, is coupled to a corresponding roadway traffic controller. The roadway traffic controller may be configured to gather data received from the sensor. The controllers are coupled to a command center that utilizes the data from the controllers to provide analysis, displays, predictions and preemptive plans for monitoring and responding to a detected threat. In certain embodiments, the roadway traffic controllers are configured to provide low-level analysis of the data gathered.

FIG. 1 is a schematic of an example of a multi-tier security network. The security network 10 is comprised of a system of systems that interact at different tier levels to collect, process and analyze data. The system 10 is configured to provide collaborative analysis and communication capability between smaller groups of stations, or nodes. In particular, the network 10 can be configured to perform complex reasoning on data gathered across a highly distributed multi-modal sensor network based on a subsumption architecture. A subsumption architecture is a way of decomposing complicated intelligent behavior into many "simple" behavior modules, which are in turn organized into layers. Each layer implements a particular goal of an intelligent agent, and higher layers are increasingly more abstract. Each layer's goal subsumes that of the underlying layers. This way, the lowest layers can work like fast-adapting mechanisms (reflexes), while the higher layers control the main direction to be taken in order to achieve the overall goal. Feedback is given mainly through the environment. In the illustrated example, the security network 10 includes a plurality of independent and autonomous sub-networks 12, 14, and 16 of nodes that are assigned a plurality of scopes and perform tier-based processing and analysis tasks.

In FIG. 1, the analyses performed at each tier can use episodic memory logic so that the processing requirements may be broken down into tier-based tasks and distributed throughout the network. The system-wide episodic memory is the selective retention of temporal, spatial, and contextual data and facts that the system ingests from sensors or derives with respect to an event. The episodic memory in the example in FIG. 1 can be distributed hierarchically throughout the system and be instantiated by criteria and value quantified logic at variant tier layers within the system. The stored episodic data and meta-data can be propagated or queried by computational tiers within the system to support reasoning processes. That distribution results in the performance of temporal, spatial and collaborative reasoning and analytics throughout the network hierarchy and provides a more evenly distributed processing load as well as situational awareness breadth.

For example, the network 10 can be configured with various sensors to provide identification of weapons of mass destruction, known terrorists and threat behavior patterns while providing a large-scale situation awareness that allows communication of a national common operational picture for critical incident response. The network also coordinates and distributes a national response plan to first responders.

The network 10 can be configured to be context driven so that use of sensors is prioritized and communication bandwidth is designated for particular functions upon threat detection. The system's reliance on episodic memory and simulation templates allows easy continual adaptation of the system through additional theoretical scenarios and allows lessons learned from actual experiences to be added back into the system as additional simulation templates. Additionally or alternatively, any intelligent programming paradigm may be incorporated alone, in combination or hybridized, such as genetic algorithms, neural networks, and/or fuzzy logic.

In an exemplary embodiment, the sub-networks are assigned various scopes that correspond to data gathering, processing and analysis and incidentally correlate to a geographical scope. The network 10 includes groups of local, metropolitan and regional stations, or nodes, as well as at least one national station, or node. For example, the system may include sub-groups, or sub-networks, of nodes that correspond to local roadway networks, regional networks, corridor networks and all of those may be combined to form a top-tiered national network. Security network 10 relies upon tier-based task allocation to distribute processing load and to reduce network traffic. The network capacity and speed are increased by utilizing the distributed processing capabilities distributed throughout the sub-networks.

Security network 10 is a first tier network that is constructed from a plurality of sub-networks, e.g., second tier networks 12, third tier networks 14 and fourth tier networks 16. Each of the sub-networks is configured to operate independently and autonomously from others of the same or lower tier networks. It should be appreciated that the number of tiers and sub-networks in each tier is not limited and may be physically organized by geographic locations or non-geographic attributes such as economic and/or socioeconomic attributes. For example, an individual sub-network may be organized on a geographical attribute such as a mountain range or peak, a river basin or other valley, an aqueduct, a coastline, a canal system, a flight corridor, a common trade route, an airport, a major building, a power plant, a sports stadium, etc. The sub-networks may alternatively be organized on economic attributes or data collections, such as credit card computer server network or other financial record computer database networks (e.g., banking and investment account databases), an automatic teller machine (ATM) network, a mobile communication network, an on-line service computer server network for services such as Internet search services, social networking services, video services, file sharing services, on-line retail services, on-line auction services, on-line music services, on-line data storage services, on-line photo services, and on-line video services. The sub-networks may include a mixture of sub-networks of different attributes including the geographic location based sub networks and non-geographic location based sub networks. Although security network 10 is described herein as a four-tier network it should be appreciated that any number of tiers may be utilized to construct the multi-tiered security network.

Each tier sub network may include a corresponding command center. The command centers can include key controls, displays and command equipment that provide real-time intelligence information for critical decision-making. In particular, each command center is provided with a reasoning agent that utilizes episodic memory to assess potential threats.

In an embodiment, security network 10 is an overarching network that coordinates multiple tiers of networks that span a particular coverage area of interest, e.g., a nationwide coverage. Security network 10 coordinates the efforts by providing nationwide communications capabilities, such as by linking the sub-networks via one or more satellites 11 or satellite constellations. Security network 10 includes a first tier command center 18 that is assigned national scope tasks. For example, command center 18 provides the key controls for coordinating communication amongst the lower tiered networks. Additionally, command center may provide displays and command equipment for organizing and initiating a national scope response, such as deployment of National Guard resources, or restriction of border thoroughfares. For example, command center 18 may be the National Incidence Management System—Emergency Operations Center (NIMS-EOC). FIG. 1 shows one first tier command center 18 as an example. Two or more first tier command centers 18 may be deployed to generate redundancy in the system.

Second tier networks 12 may be regional networks. For example, second tier networks 12 may be organized by state, or by a nationwide grid. Second tier networks 12 may include third tier networks 16, fourth tier networks 14 as well as independent second tier stations 24.

Second tier command centers 20 are assigned second tier tasks, such as regionally based tasks, and may be included in each of second tier networks 12. For example, a regional network may include and be in communication with a Critical Incident Response (CIR) regional command center. Each regional network is assigned region-specific tasks such as monitoring and controlling borders and communicating regional emergency situation information to first tier command center 18.

Third tier networks 14 are provided having a different scope than second tier networks 12. It should be appreciated that the scope of third tier network\ 14 may be selected to be fully encompassed by second tier networks 12, or, in an alternative configuration, the scope of third tier network 14 intersects with second tier networks 12, as shown in FIG. 1. In this example, the third and fourth tier networks 14 and 16 are shown to share some common network nodes (sensor nodes 26). For example, third tier networks 14 may be metropolitan networks or corridor networks. Third tier networks 14 may include subsets of second tier network components or they may cross over and integrate components from multiple second tier networks 12. The third tier network 14 may include second tier stations 24 and/or fourth tier stations 26, as well as independent third tier stations 28. In such an exemplary embodiment, third tier networks 14 may be correspond to major thoroughfares, such as an interstate highway. The stations included in third tier network 14 are assigned sub-network specific tasks, such as tasks specific to the particular corridor.

In FIG. 1, the third tier network 14 extends through a plurality of second tier networks and utilizes second, third and fourth tier stations (24, 26 and 28, respectively). The intersection of third tier network 14 with multiple second tier networks 12 and fourth tier networks 16 provides an advantage in that communications that would otherwise require handoffs between sub-networks may be easily routed through a single third tier network 14. A third tier command center 22 may also be provided that coordinates the activities and communications between the stations that make up third tier network 14.

The network in FIG. 1 also includes local sub-networks, fourth tier networks 16. Fourth tier networks 16 can be constructed from a plurality of fourth tier stations 26, or fourth tier nodes. Similar to the higher level sub-networks, fourth tier network 16 may include a fourth tier command center 23 if desired. Multiple fourth tier networks 16 may be tied directly to third tier command center 22 or second tier command center 20. Fourth tier stations 26 may be located at any locality, such as a traffic intersection or toll booth and are generally configured to provide the first indication of a possible emergency event unfolding. Fourth tier stations 26 may additionally, or alternatively, be provided in mobile forms, such as airplanes, boats, and/or automobiles.

The communications in the multi-tier network 10 in FIG. 1 can be in various configurations. In one configuration, for example, any command center in a tier sub network can access any node in that tier or a lower tier. For example, FIG. 1 shows that the first tier command center 18 can directly communicate with the second tier command centers 20 and a command center 14 in a third tier sub network 14 by bypassing the second tier. Notably, in this configuration, the command center 18 can directly communicate with any node 26 in the network 10 to control the operations of the node 26 and to collect data from the node 26 via any available communication link between the command center 18 and the node 26.

Figure 2:
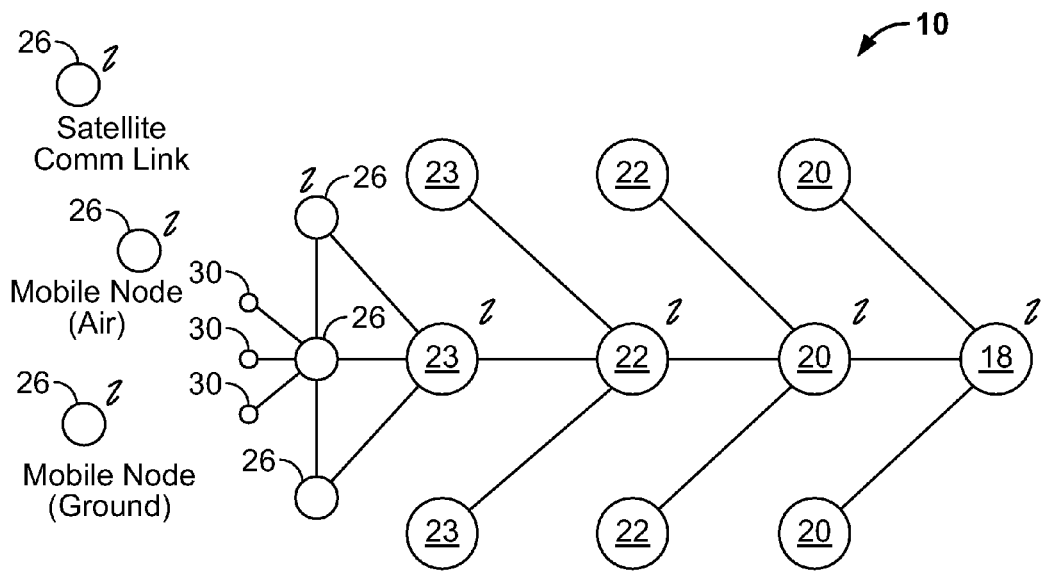
FIG. 2 is a schematic of the security network in one implementation of a multi-tier configuration.

FIG. 2 is a schematic of the security network 10 of FIG. 1 in one implementation of a multi-tier configuration. This example shows that each lower tier command center is subordinate to a higher tier command center and all nodes are organized in a networked computer hierarchical architecture. Each computer is considered as a node of the system. The hierarchy is comprised of several levels, beginning with a single node at the top of the hierarchy. The topmost node 18 is connected to a set of nodes in the level below it, in a one-to-many relationship: for one national node 18, there is a set of regional nodes 20. Likewise, for each regional node 20, there is a set of metropolitan nodes 22 below it, again in a one-to-many relationship. Each metropolitan node 22 is connected to a set of local nodes 23, serving a portion of a metropolitan area. Each local node 23 is connected to a set of so-called intersection nodes 26 which may be located at roadway intersections, for example. Additional sensor nodes at the same hierarchical level as the intersection nodes 26 may also be deployed, serving similar functions but not located at traffic intersections. Each intersection node 26, or sensor node is connected to one or more sensors 30, through which it gathers data. Additional mobile nodes 26 can be included as part of the system, which can be carried by emergency services and responder agencies. These include hand-held, ground-based, vehicle-based nodes, and nodes carried by aircraft, e.g., police helicopters, etc.

In one configuration, a tier command center can communicate with any node below it. For example, the region node command center 20 may directly communicate with a node 26 to collect data from the node 26 and to send commands to the node 26.

Figure 3:
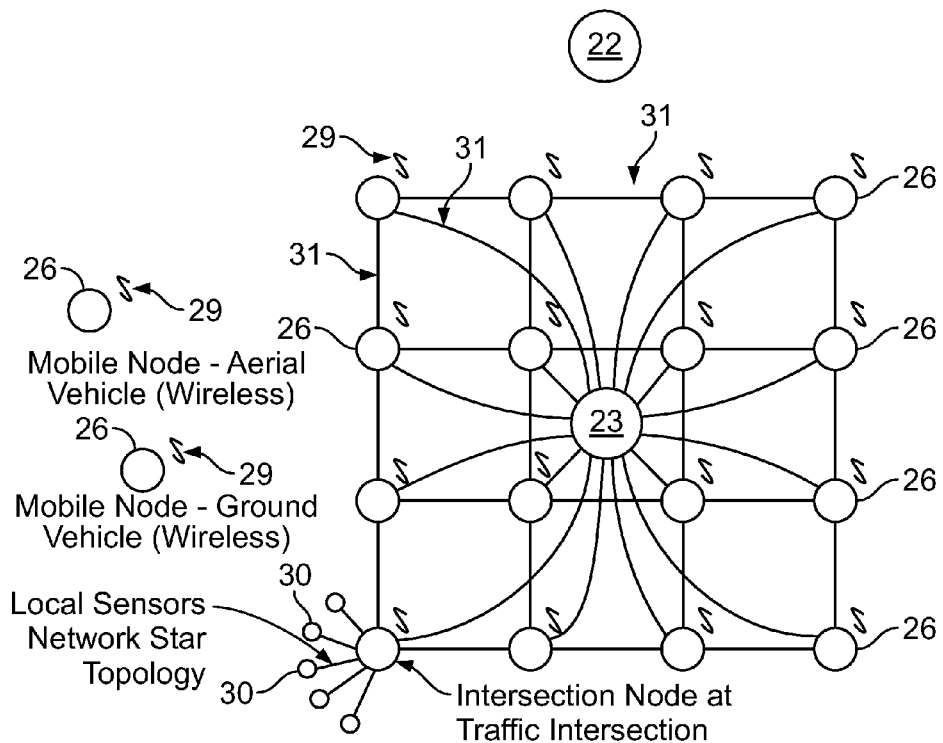
FIG. 3 is a schematic of a portion of the security network.

Referring to FIG. 3, the local sub-network 16 includes a plurality of fourth tier stations 26. Each of fourth tier stations 26 communicates with others of the stations over a communications grid that may include both wireless links 29 and wired links 31. Each of fourth tier stations 26 may be either stationary or mobile and they may include one or more sensors 30. The plurality of stations can be provided with direct communication to a local command center 23, which may also be referred to as an Executive I node. Local command center 23 can be provided with direct communication with a higher level command center such as second tier command center 20 or a third tier command center 22.

In one implementation, primary, secondary and redundant communication links can be provided. For example, the network can be constructed to allow simultaneous communication to and from multiple tiers, i.e., the tier-based organization of the network does not result in hierarchical communication restrictions. The communication links may rely on satellite communications via various satellite constellations. Furthermore, wireless communications are provided between desired command centers and desired networks. For example, wireless communications may be provided over SIEMENS MC75 wireless communications modules. It should be appreciated that any form of satellite, mobile and/or landline communications systems may be incorporated.

Each command center may have a network of distributed stealthy and non-stealthy resources for monitoring and analyzing data. For example, local or distant (e.g., satellite-based sensor technologies) sensors may be used to gather data. In the present embodiment, second tier command centers 20 control resources anchored to the nation's transportation system to perform data and intelligence collection in that region. The stealthy resources can include sensors for detecting one or more hazardous materials, such as CBRNE materials.

In an embodiment, fourth tier network 16 of security network 10 is comprised of the nation's roadway traffic controllers. All major U.S. cities have a traffic light system infrastructure that comprises many identical controllers. SIEMENS, for example, is a worldwide presence and is estimated to control over 1000 traffic control centers and over 170,000 controllers in 78 countries. As controller technology has advanced, the traffic light system infrastructure has incidentally been provided with increased excess processing capacity that far exceeds the needs of simple traffic control. In an embodiment, a network security system utilizes, at least in part, the excess capacity of traffic signal controllers, that are already located throughout local roads, as well as interstate highway on-ramps and off-ramps. Such a system may be supplemented with additional processing capacity if desired.

Figure 4:
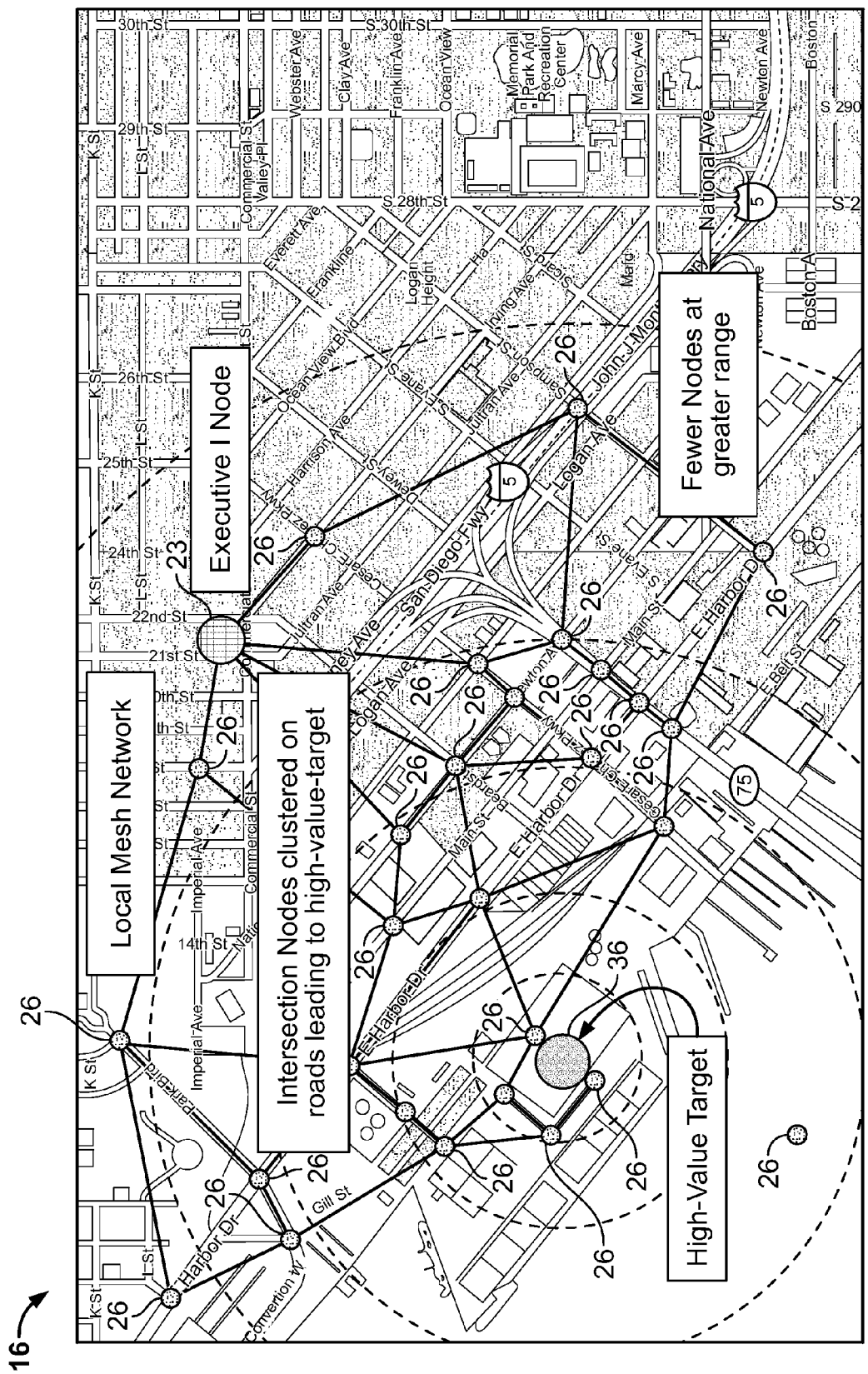
FIG. 4 is a schematic of a portion of an embodiment of the security network.

FIG. 4 illustrates an example of the local sub-network 16 that is organized around a shipping port 36 and provides zonal defense of a high-value target. In this example, shipping port 36 is identified as a high-value target and a plurality of stations 26 are dispersed about shipping port 36 for assessing potential threats upon the target. In particular, stations 26 are dispersed at intersections of roadways that lead to shipping port 36. In the illustrated embodiment, the density of stations 26 varies in relation to the distance from shipping port 36. For example, stations 26 are more widely distributed further away from shipping port 26. Fourth tier command center 23 is employed and is in communication with stations 26. It should be appreciated that in the present embodiment a mobile station 26 may be incorporated into a boat so that shipping port 36 may be protected from water-borne attacks.

Figure 5:
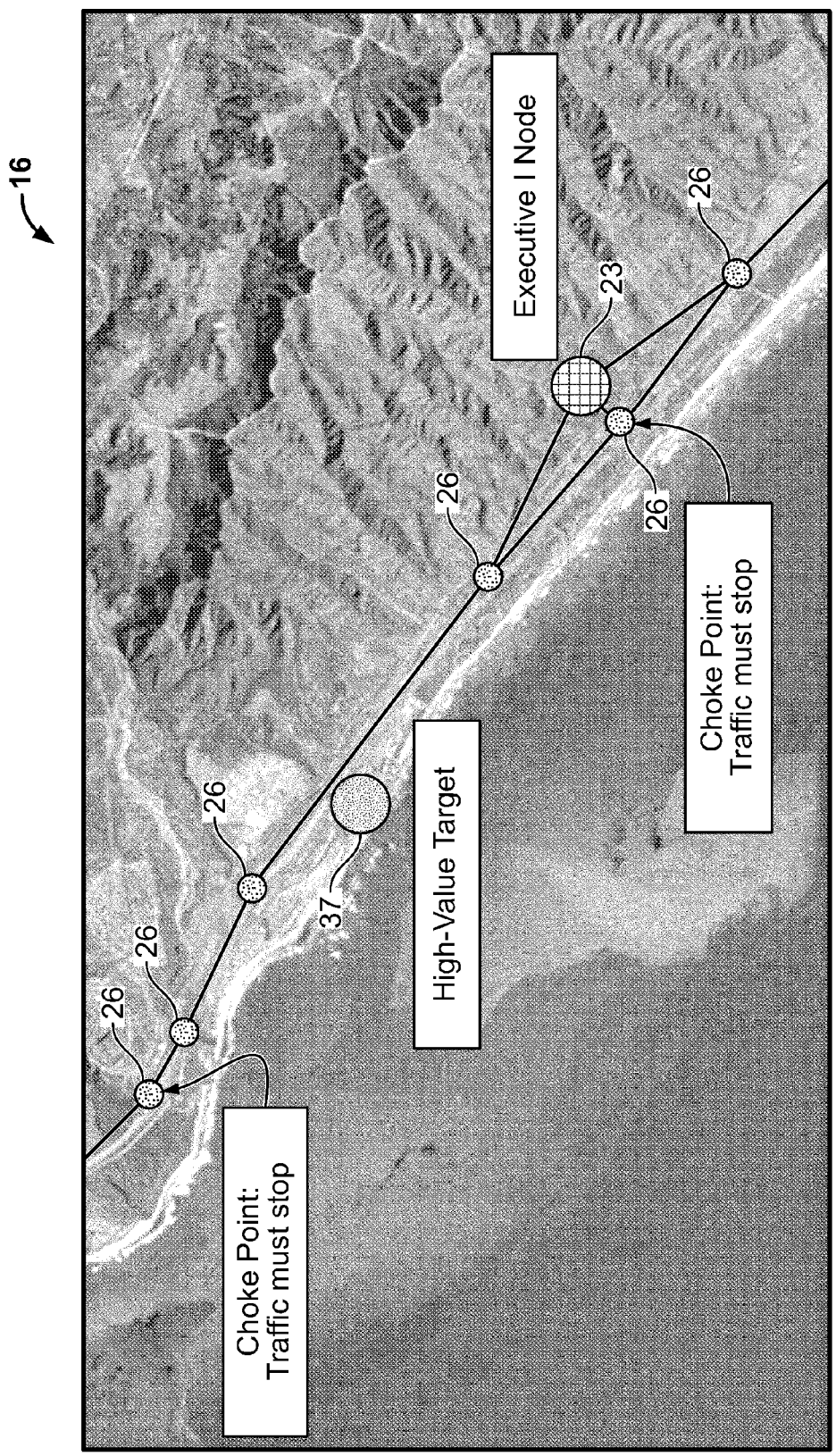
FIG. 5 is a schematic of another portion of an embodiment of the security network.

In another embodiment, a sub-network may be distributed over a highway that is located adjacent a high-value target such as power plant 37, shown in FIG. 5. In particular, the illustrated embodiment illustrates incorporation into a corridor that includes controllable choke points. The sub-network is incorporated into a larger security network as a fourth tier network 16, but it should be appreciated that it may be incorporated as a third tier corridor network 14 if desired. The sub-network includes a plurality of fourth tier stations 26 distributed along an interstate highway that passes adjacent to power plant 37. In the present embodiment, a station 26 on either side of power plant 37 may be provided with traffic signals or blockades so that in the even of a detected threat approaching on the highway, traffic may be halted in either or both directions. A fourth tier command center 23 is also provided that may be used to control the actions of stations 26 as well as to analyze data collected by stations 26 or to publish analyses results to the higher level sub-networks. Stations 26 and command center 23 may be incorporated into existing systems, such as truck weigh stations and border checkpoints. Similar to the previously described embodiment, power plant 37 is located adjacent to a large body of water and as a result, the sub-network may include mobile stations such as boats.

Figure 6:
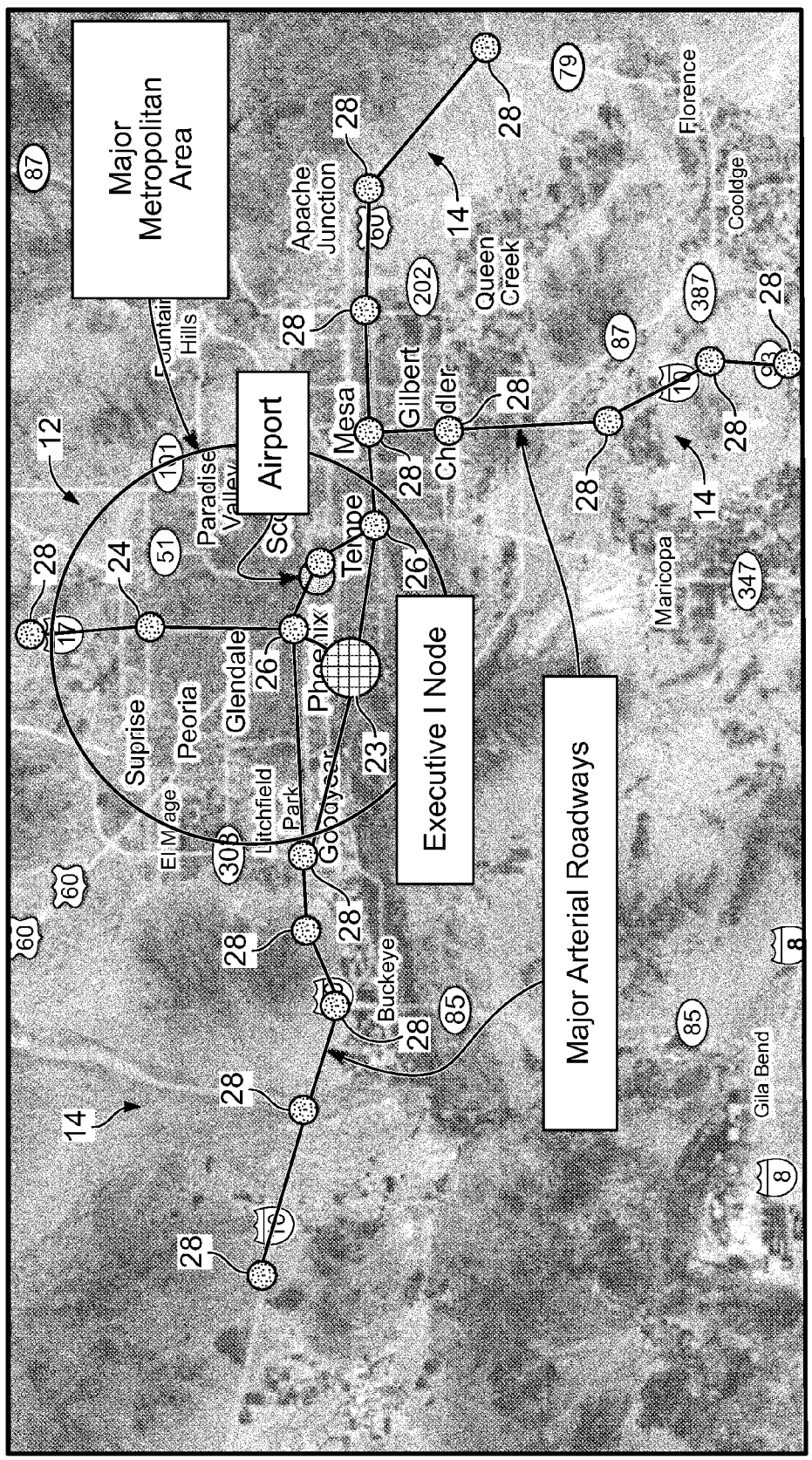
FIG. 6 is a schematic of another portion of an embodiment of the security network.

In yet another embodiment, shown in FIG. 6, a portion of a security network may be organized on a major metropolitan area and provide defense by monitoring and controlling entry roads. For example, a plurality of fourth tier networks 16 and third tier networks 14 may intersect at or near a major city. Third tier networks 14 may be organized along major arterial roads such as interstate highways and/or metropolitan areas. Stations may be included at particular areas of interest such as airport 38, and/or in traffic controllers or at any other desired location. A plurality of third tier stations 28, second tier stations 24, fourth tier stations 26 and various command centers, such as command center 23, may be included.

A sensor node 26 can be implemented in various configurations. A sensor node 26 can include a node module that includes a microprocessor that run a set of node module software tools for various node operations, an interface with one or more sensors, and a communication module for communicating with other nodes 26, a local command center 23 or a higher tier node in the network.

Figure 7A:
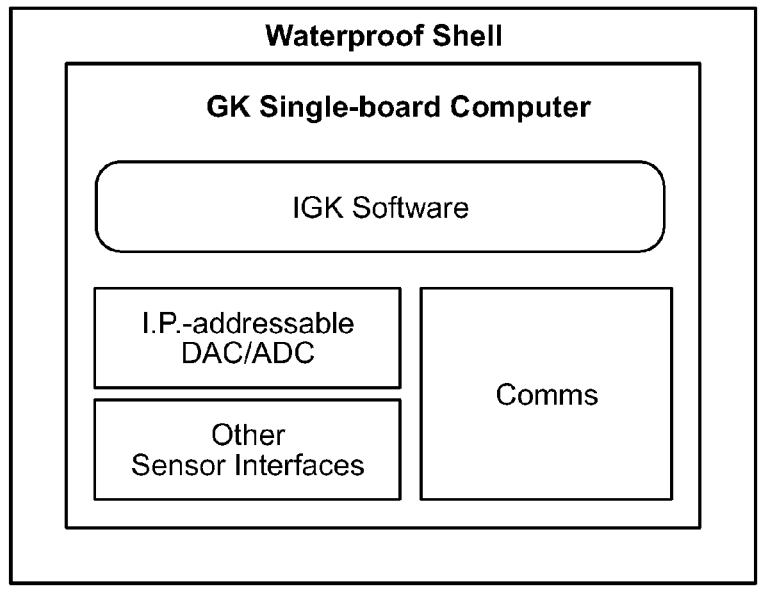
FIGS. 7A and 7B shows example designs of a sensor node.
Figure 7B:
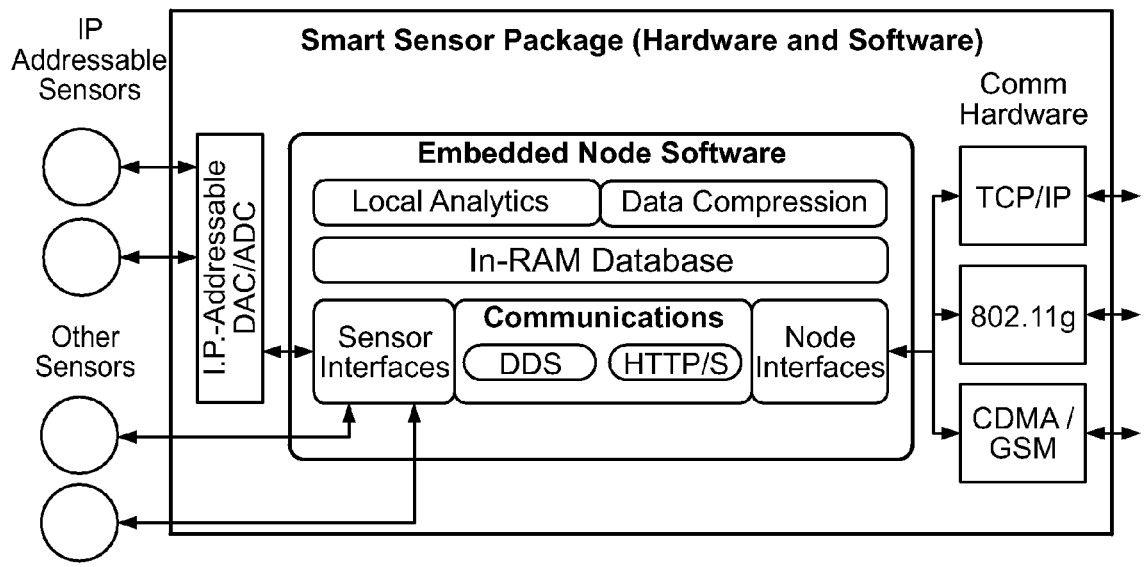

FIG. 7A shows one example of a sensor node module 26 that includes a single-board computer to run node software, an IP addressable DAC/ADC interface to one or more IP addressable sensors such as cameras, sensor interfaces to other sensors and a communication module for communications. FIG. 7B shows an implementation of the sensor node module 26 in FIG. 7A. The embedded node software installed in the computer includes data compression software, local analytics software for analyzing sensor data, node database for storing sensor data, communication software, sensor interface software and node interface software. The communication module hardware include electronics for TCP/IP, WiFi, and wireless mobile communication ports. As shown in FIG. 7A, the sensor module 26 may include a shell unit to enclose all components and may be a waterproof shell. The sensor module 26 includes a power supply for powering the module. This power supply may be an AC power suppler connected to the power grid or a portable power source such as a battery.

Figure 8:
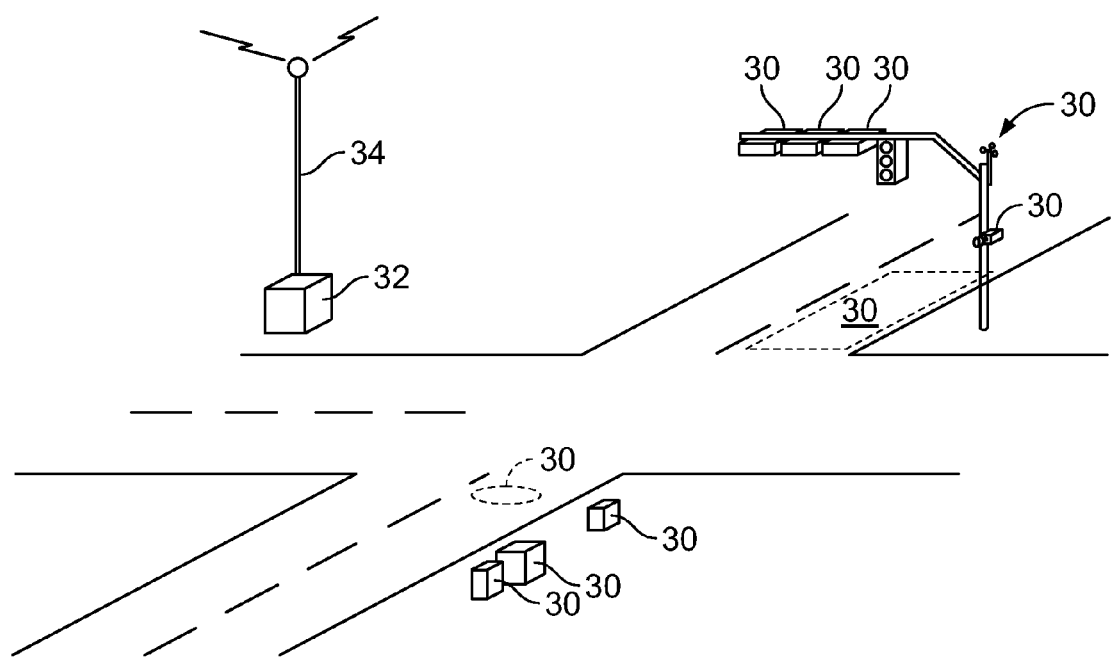
FIG. 8 is a schematic of a traffic intersection incorporated in an embodiment of the security network of the present invention.

FIG. 8 shows an exemplary fourth tier station 26 utilizing a roadway traffic controller located at a roadway intersection. In this example, fourth tier station 26 comprises sensors 30, at least one controller 32 and communications devices 34. Sensors 30 can be configured for detecting various parameters. Depending on the sensing needs at a particular location, various different sensors may be deployed at the location and such sensors can operate in concert to provide sensing data to a sensor node.

The U.S. Department of Homeland Security recently issued capability specific national priorities to strengthen the nation's defenses against threats. The priorities include: 1) strengthening information sharing and collaboration capabilities; 2) strengthening interoperable communications capabilities; 3) strengthening chemical, biological, radiological, nuclear and explosives (CBRNE) detection, response and decontamination capabilities; and 4) strengthening medical surge and mass prophylaxis capabilities. The Secretary of Homeland Security was also tasked with developing and administering a National Incident Management System (NIMS) which is intended to provide a consistent nationwide template to enable all government, private-sector, and non-governmental organizations to work together during domestic incidents. The sensors 30 can be configured to detect CBRNE materials. The sensors may be configured to detect the presence of those hazards by sampling any gaseous, liquid or solid material. For example, chemical sensors that may be used include solid-state gas sensors that measure a physical property changed by a reaction at the surface, solid electrolytes that measure electrical conductivity changes, catalytic sensors that measure temperature change due to heat of reaction at the surface, ion mobility mass spectrometers and liquid crystal display sensors. Biological sensors may include, among others, bioluminescence sensors, optical sensors, mass sensors, electrochemical sensors, quantum dot technology sensors, sensors utilizing dielectrophoretic techniques, sensors utilizing acoustic lysing or other microbial excitation, membrane technology sensors or sensors utilizing any other technology which detects and/or defines a threat organism. Examples of radioactive material sensors that may be utilized include proportional counters, Geiger-Muller counters, and Reiter-Stokes ionization chambers sensors. Examples of nuclear sensors include low background detectors, neutron detectors and alpha/beta/gamma detectors. In addition, sensors for explosive materials may include ion mobility spectrometers and direct sampling ion trap mass spectrometers. It should further be appreciated that various other sensors and sensor technology may be incorporated such as muon tomography, direct x-ray, backscatter x-ray, gamma-ray imaging, advanced spectroscopic portal technology, nuclear resonance fluorescence imaging, hyper-spectral imaging, etc. In some applications, the sensors can be incorporated in security network 10 to provide passive detection so that their presence is not detectable. As mentioned previously, any sensor may be utilized and the types of sensors are not limited by their proximity to the monitored location. For example, distant sensors, such as satellite based sensors, may be utilized to monitor and may be incorporated into stations included on any tier.

Sensors 30 used in the system can also include biomechanical sensors (breath signature, heart rate, etc.) to determine threat related manifestations; biometrics to identify the individual of interest (facial recognition, gait analysis, vein pattern, iris/retinal scans, fingerprinting, etc.) by comparison to a known database; and behavioral assessment techniques as provided by baseline optical or other sensor data and subsequent machine interpretation defining behavior of interest. The system can also be configured to include contraband sensors as part of the sensors 30 to target contraband in addition to CBRNE targets.

Additionally, the regional command centers may also have control of non-stealthy resources anchored to the nation's transportation system. Such non-stealthy resource may include, but are not limited to, weather-monitoring devices such as Doppler radar systems, precipitation gauges, anemometers, thermometers, barometers, hygrometers, barographs, etc. Additionally, they may include other non-stealthy surveillance resources such as cameras and their related data transduction or interpretation capabilities that may be used to perform license plate recognition, facial recognition, or behavior recognition. Such recognition features may be used to track known terrorists and criminals on the public roadways.

Controller 32 includes a processor that is provided with reasoning logic that provides autonomous and automatic data processing and analysis. As a result, the network does not rely on a centralized processing hub to sort and process data collected by all of the data sources. Instead, each processor may be independently capable of sorting and analyzing data, making predictions and designing preemptive plans. The preemptive plans may then be sent to second tier command center 20 or first tier command center 18 so that the plans may be coordinated to reduce response times and to avoid conflicting routing of resources.

The sensing mechanism in the system can include video analytics to analyze video data to detect whether the same vehicle or person has been frequenting a high-value target location such as a nuclear power plant. The system can be configured to determine if this is innocent activity or if the represents a potential threat. The system compares its information against various watch-lists for a match. The system is installed at nuclear plants and other high-value targets in other parts of the country. In operation, the system will try to link data associated with the vehicle or person to similar events at the other GK installations. A threat confidence level will be determined. If the threat exceeds a predetermined series of thresholds, the system will identify the threat and signal appropriately.

Figure 9:
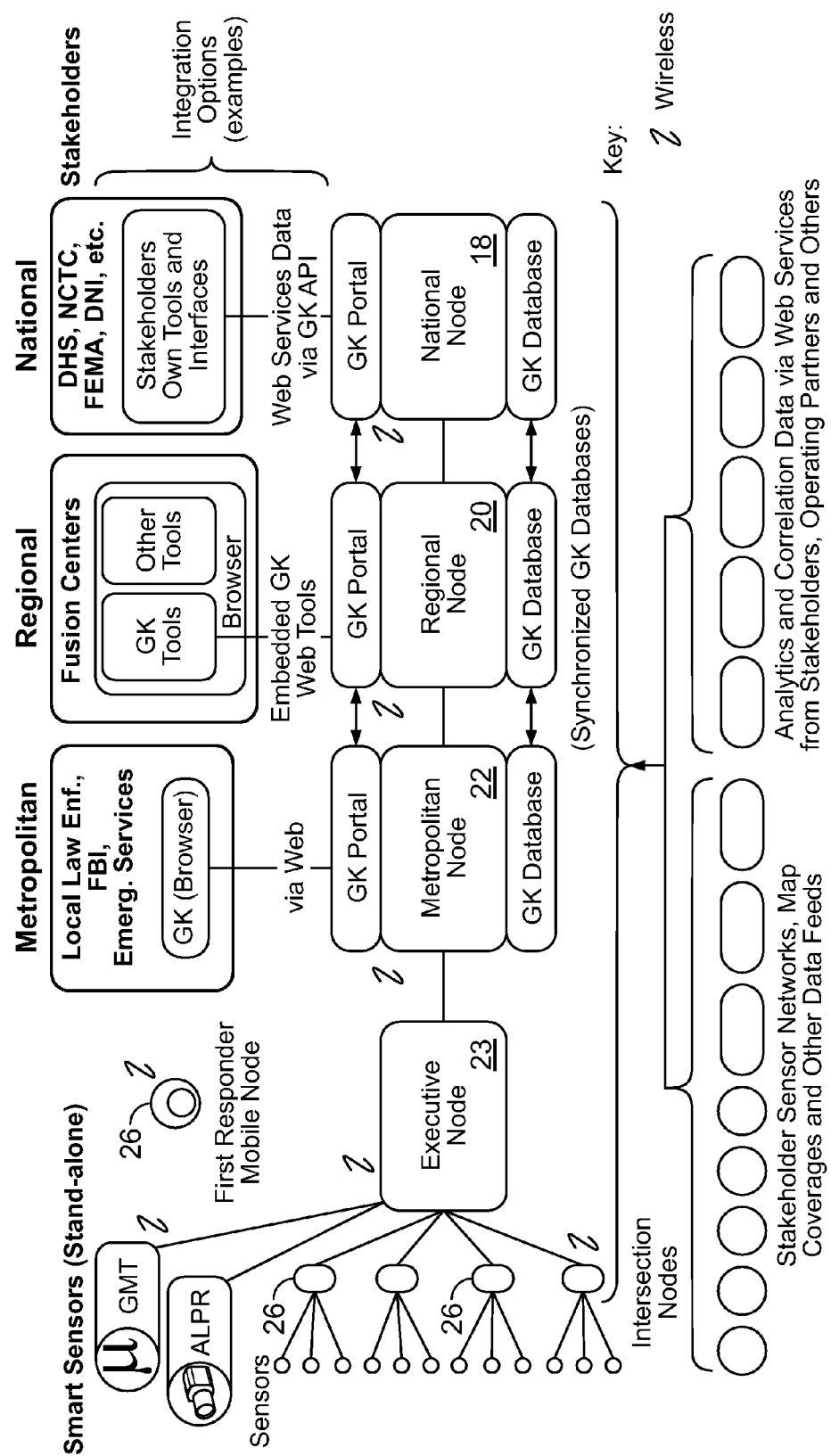
FIG. 9 shows an example of a multi-tier system in connection with various external computers and databases.

FIG. 9 shows one exemplary implementation of the multi-tier system in FIG. 1 in connection with various computer systems that are connected to the system. The sensor nodes 26 as shown include one or more Automated License Plate Recognition (ALPR) systems, one or more cargo container detectors such as radioactive detectors (e.g., Geiger-Muller counters and others), and first responder mobile sensor nodes. Other sensor networks and databases may also be connected to the system to allow the multi-tier network to collect and analyze data from such sensor networks and databases. Other computer systems at the metropolitan level, the regional level and the national level may be installed with proper software modules to interact with the system.

FIGS. 10-13 show examples of node structures in the multi-tier network 10. The stations and command centers included in security network 10 rely on a common operating environment that provides an interface between the nodes of the multi-tiered security network. The operating environment is distributed to each component of the network so that every component is compatible with the other components and so that they may share processing capabilities. The operating environment can be driven by a discrete set of specific user configuration components to become a specialized operating environment for a particular tier of command and control. As a result, although all components share a common operating environment, the environment may include aspects specifically designed for the respective problem-set of that tier.

The operating environment is optimized based on those particular problem sets and, as a result, each layer has a specifically designated set of tasks to process. Therefore, the system can optimize the use of processing power in the system by distributing specific tasks to processors included in the nodes of a specific tier. Additionally, the structure reduces the communication network traffic by sending analysis results rather than raw data in the first instance. The next higher-tier network, however, may request the raw data so that a reasoning module may be updated if an emergency situation develops.

Figure 10:
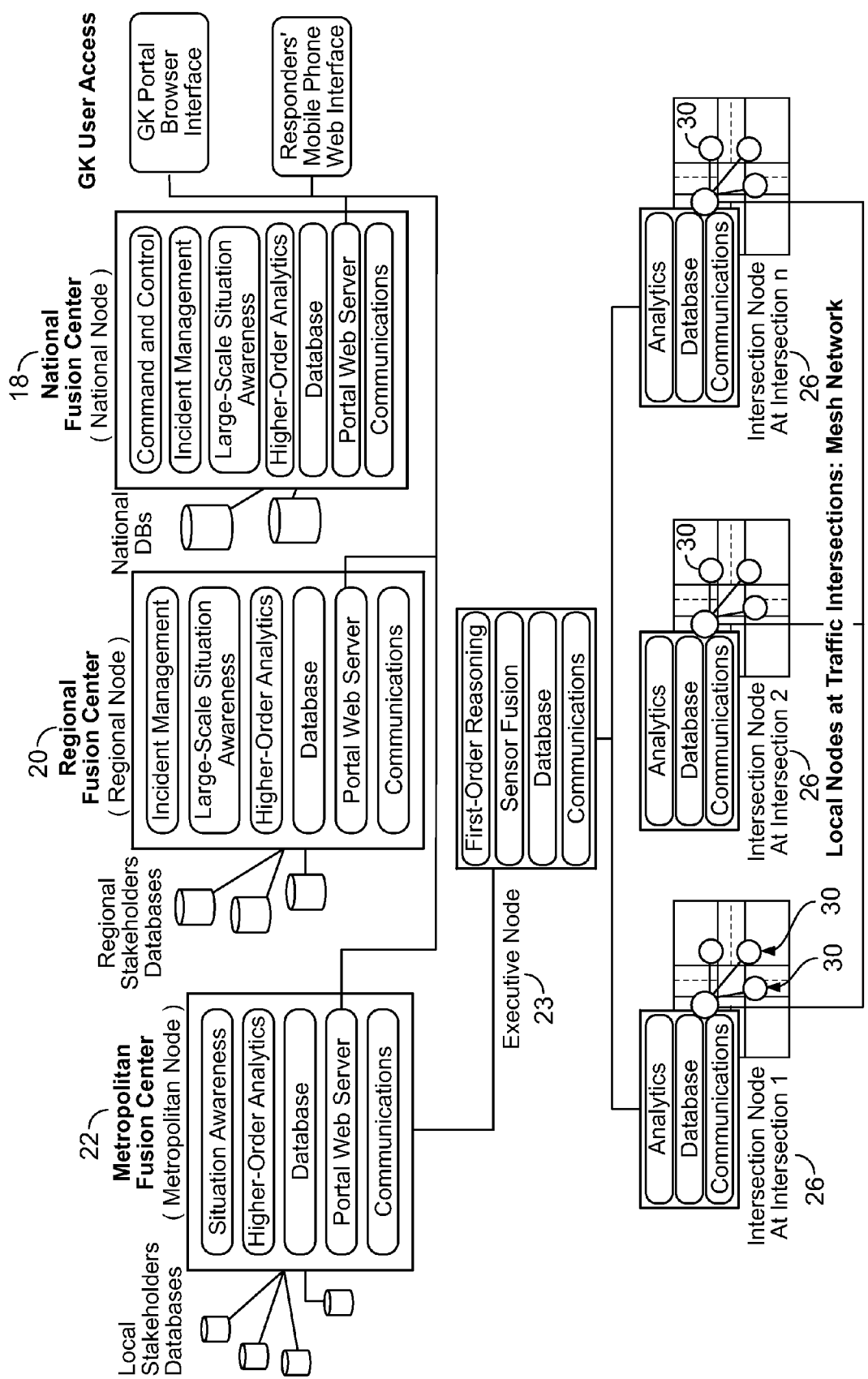
FIG. 10 shows an exemplary implementation of a multi-tier system where the sensor nodes include intersection nodes at different intersections of roadways.

FIG. 10 shows an exemplary implementation of the multi-tier system 10 where the sensor nodes 26 are intersection nodes at different intersections of roadways. Each sensor node 26 is connected to one or more node sensors to collect sensor data and includes local database to store sensor data and local analytics to analyze the sensor data. In this example, the sensor nodes 26 are connected in a mesh network which is connected to a fourth tier executive node 23. Third party databases labeled as "stakeholder databases" are connected to higher tier nodes 22, 20 and 18 in this example. In addition, authorized or registered system users can access the system via the nodes 22, 20 and 18 via system portal browser interface installed on user computers. Authorized or registered system users can also access the system through nodes 22, 20 and 18 via mobile web interface via mobile communication devices such as cell phones, PDAs and mobile computers.

In this example, the fourth tier stations 26 provide the lowest level node. In various embodiments, the fourth tier stations correspond to roadway intersection controllers, i.e., intersection nodes. The intersection nodes are generally tasked with tier specific tasks such as sensor control, data collection, data processing and data analysis, and communications with higher level tiers.

In FIG. 10, the higher tier commend center nodes 23, 22, 20 and 21 are shown to include various data collection, processing, analysis and decision functions. The node 23, for example, has its database for storing data, a sensor fusion module for aggregate received sensor data from different sensor nodes 26, and a first-order reasoning module to analyze received data. Nodes 22, 20 and 23 include portal web servers for interfacing with various system users and third party databases and other systems. Nodes 22, 20 and 23 also include respective analytics modules for data analysis and situation awareness modules to monitor various system state variables.

Figure 11:
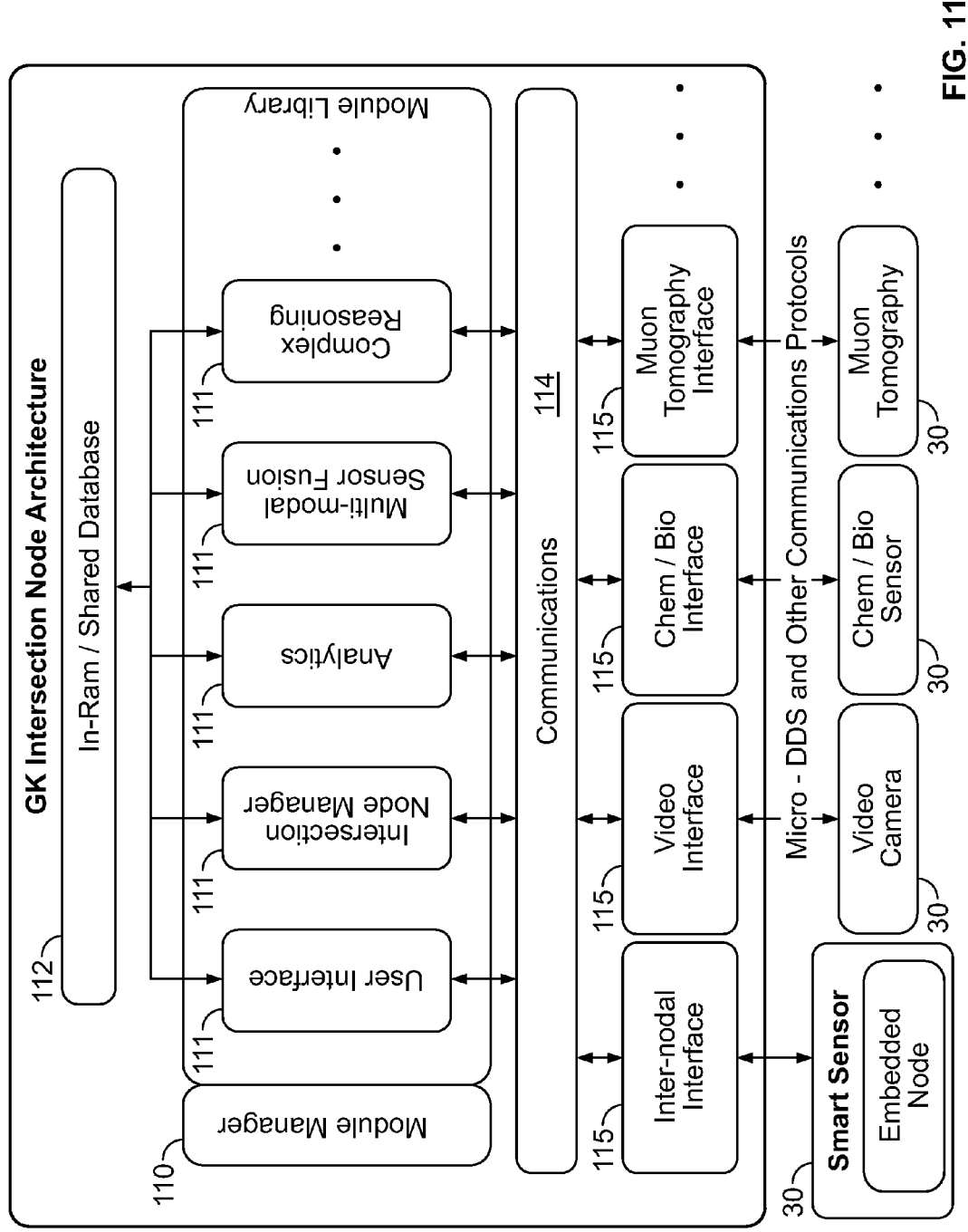
FIG. 11 is a schematic of the architecture of an intersection node of an embodiment of the security network.

FIG. 11 shows an example of the intersection node 26. This intersection node 26 includes a module manager 110, a database 112 and communications manager 114. Module manager 110 includes a plurality of modules 111 that provide various functions. For example, modules 111 may provide a user interface, an intersection node manager, various analytics (such as a data warehouse module), multi-modal sensor fusion, complex reasoning, etc. Each of modules 111 may write to or draw information from database 112 to provide the desired function. The communications manager 114 generally includes interfaces 115 that provide communication between various sensors 30 and module manager 110 so that the gathered data may be analyzed. Additionally, communications manager 114 provides an interface for other nodes included in the sub-network. The interfaces provide data to module manager 110 in compliance with a desired communications protocol, such as distributed data services (DDS) or micro-DDS, that allows each of the stations and command centers to easily communicate with each other.

In operation, the intersection nodes 26 can be tasked with event detection, first order reasoning, threat classification and localized surveillance. Each intersection node collects data from sensors, such as CBRNE sensors, and monitors the data for a triggering event. The sensors collect data and the station analyzes the data for threshold amounts of the CBRNE materials. The station can maintain a record of both above and below threshold readings. In the event a station detects a greater than threshold value of such a material that determination is published to the associated command center. If that station detects a lower than threshold value, additional sensor data may be analyzed or requested from other intersection nodes. The station may be capable of collecting and analyzing any type of desired data including, but not limited to CBRNE sensor data, video data, audio data, environmental data, etc. In addition, the station may be provided with a cross-reference database or a communication link to a cross-reference database so that fourth tier station 26 is capable of providing a wider range of analyses such as video recognition analysis.

Referring to FIG. 10, the stations 26 are assigned to a fourth tier command center 23. Command center 23 coordinates and manages stations 26, receives data and analyzes results from the associated stations 26 and publishes information, such as alerts, to an overarching communications system that links command center 23 and the higher level command centers, such as regional command center 20 and national command center 18 and distributes information published by other command centers to stations 26 within its control.

Figure 12:
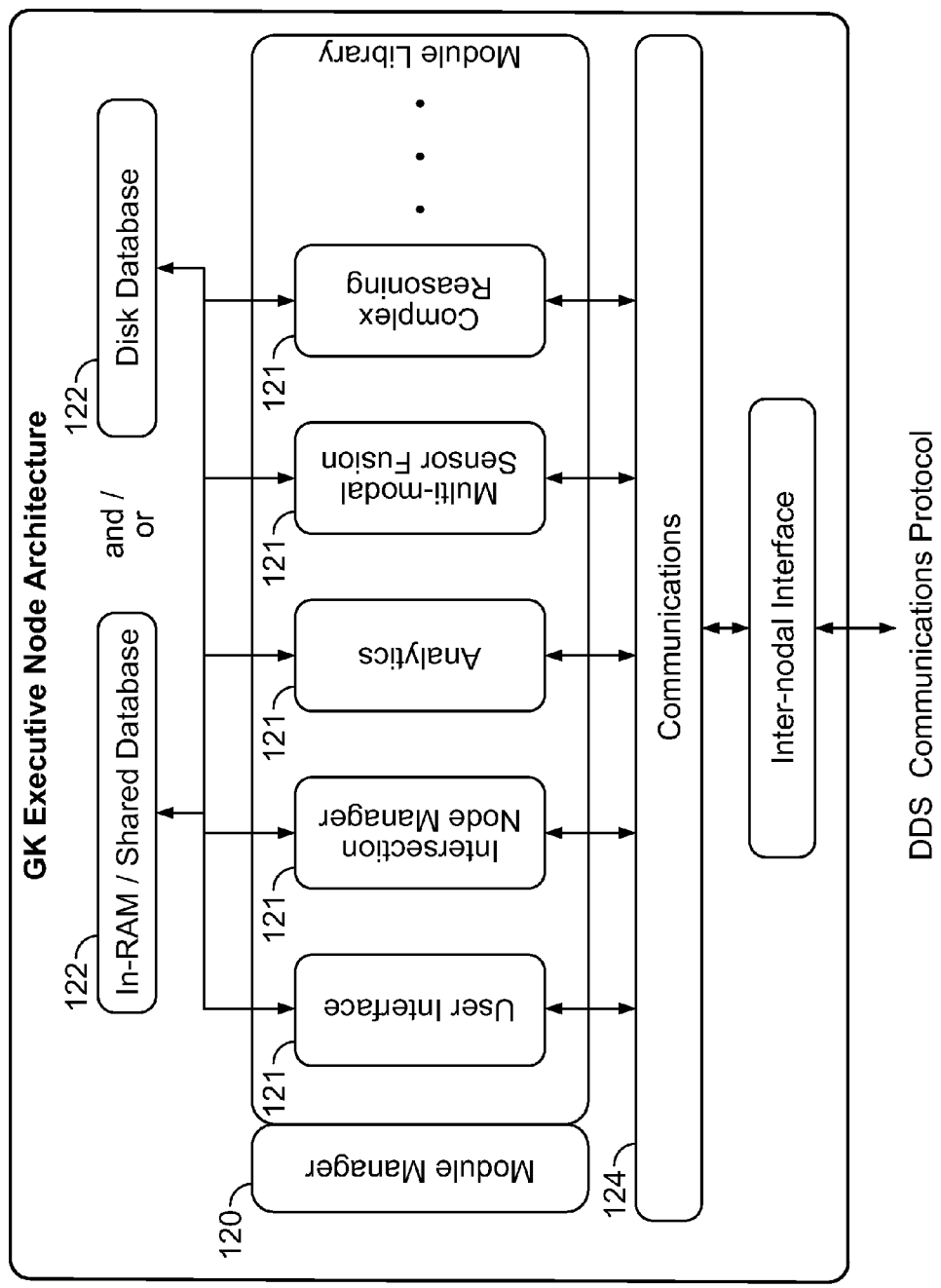
FIG. 12 is a schematic of the architecture of intermediate tier node of an embodiment of the security network.

Similar to the lower level intersection nodes, command center 23 includes a module manager 120, one or more databases 122 and communications manager 124, as shown in FIG. 12. Module manager 120 includes a plurality of modules 121 such as a user interface module, an intersection node manager, various analytics (such as a data warehouse module), multi-modal sensor fusion, complex reasoning, etc. Databases 122 may include any permanent or temporary memory device or combinations thereof. Communications manager 124 generally provides an interface 125 between the command center 23 and nodes that make up the sub-network. As mentioned above, interface 125 allows command center 23 to communicate efficiently with associated nodes over a common communication protocol.

Command center 23 can be tasked with disseminating local situation awareness to users and higher level network components. In addition, command center 23 performs higher-order analytics on data and alerts published by stations 26. Command center 23 may also be in communication with local stakeholder databases that may be used in the higher-order analytics. For example, command center 23 may provide traffic flow analysis and may be linked to local roadway databases and may combine that information with sensor data and controls provided by stations 26 to alter traffic patterns so that potential response routes may be cleared, a detected threat may be stalled and/or traffic may be diverted from a threat.

The next higher tier sub-network, which includes command center 20, provides regional scope capabilities. The regional command center 20 can be configured to perform regional incident management and provides large-scale situation awareness, in addition to higher-order analytics, database maintenance, and communications between adjacent tiers and regional stakeholder databases.

Figure 13:
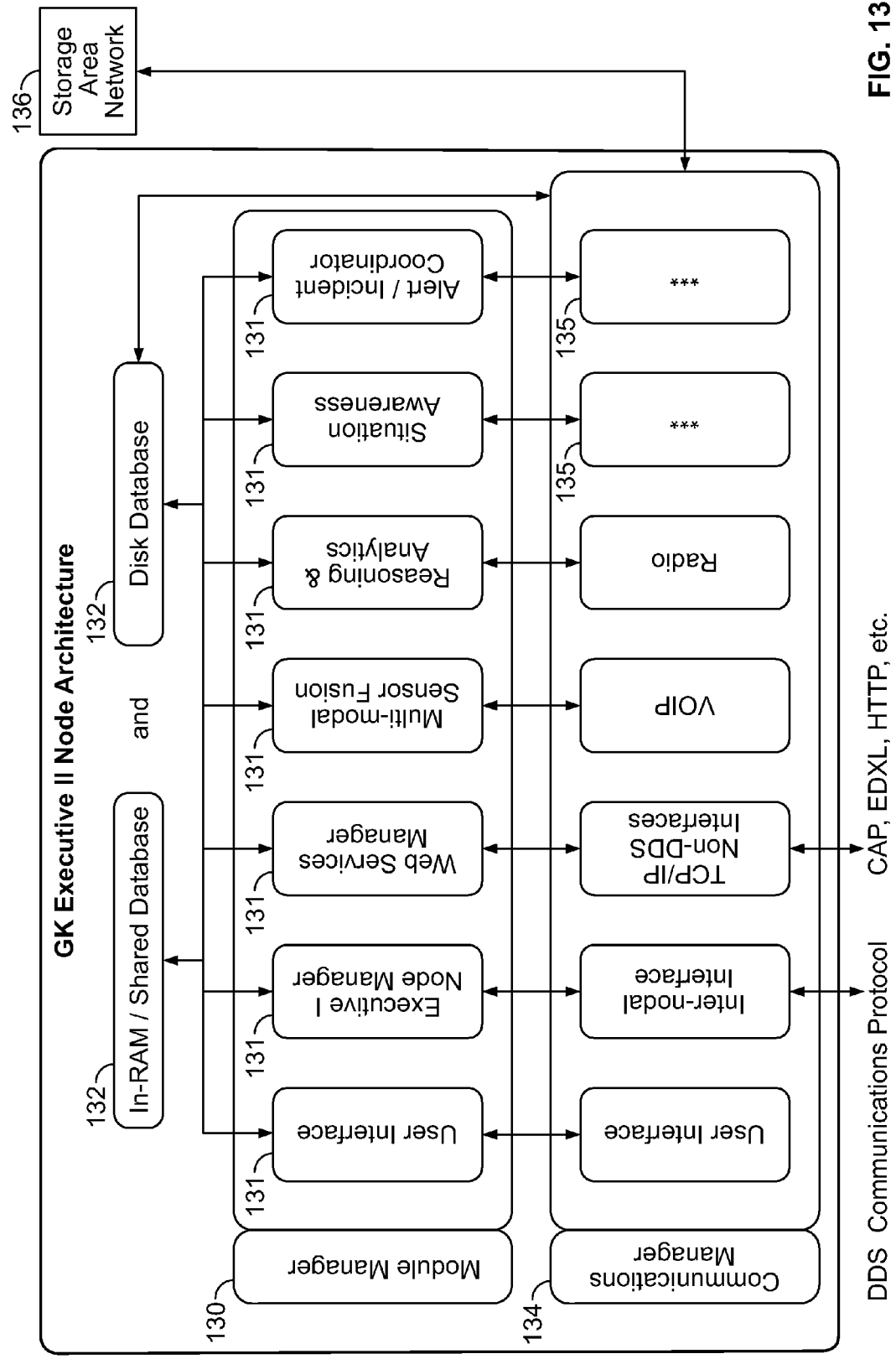
FIG. 13 is a schematic of the architecture of a high tier node of an embodiment of the security network.

Referring to FIG. 13, command center 20 is constructed from module manager 132, databases 132 and communications manager 134. Module manager 130 includes a plurality of modules such as a user interface module, a node manager for managing information from the lower level tiers, analytics (such as a data warehouse module), multi-modal sensor fusion, complex reasoning, situation awareness, alert/incident coordinator, etc. Databases 132 may provide permanent or temporary storage and may include cross-reference databases and/or storage space for the analytics module included in module manager. The communications manager 134 includes various communications interfaces 135 that allow command center 20 to communicate with users, nodes of the same or other tiers, and first responders. In particular, interfaces 135 may include a user interface, an inter-nodal interface, TCP/IP non-DDS interfaces, a voice-over-internet protocol interface, a radio interface, etc. It should be appreciated that any industry standard data sharing protocol may be employed, such as National Information Exchange model (NIEM), Emergency Data Exchange Language (EDXL), or IEEE 11512 for example. Additionally, communications manager 134 may provide communications with a storage area network 136.

The command center 18 provides command and control over the entire security network 10. It provides incident management, large-scale situation awareness, higher-order analytics and includes one or more databases and communications management. Command center 18 may also be linked to major stakeholder databases, such as Interpol. Command center 18 may also distribute data mining tasks to lower-tiered command centers, such as review of financial records, motor vehicle records, and additional detailed video data gathering. In one implementation, the command center 18 may be constructed with architecture identical or similar to that shown in FIG. 13. The operating environment of security network 10 includes display modules, or engines, that create a visual environment that decision makers may use to gain full real-time situational awareness. The display modules provide means to maximize the visualization of a variety of fused multi-sensor data types. The display modules integrate geo-positioned and conventional camera source video, computer generated imagery, display technologies and relational database management tools. The combined display allows the user to make assessments, operate and shape the dynamics of the problem as well as experiment with various contingencies. For example, a simulation module is included that allows a user to simulate a scenario and to test countermeasures, skills and judgments. Various modules that may be included are mapping modules, three dimensional modeling modules, traffic flow modules, responder tracking modules, impact prediction modules, etc.

Figure 14:
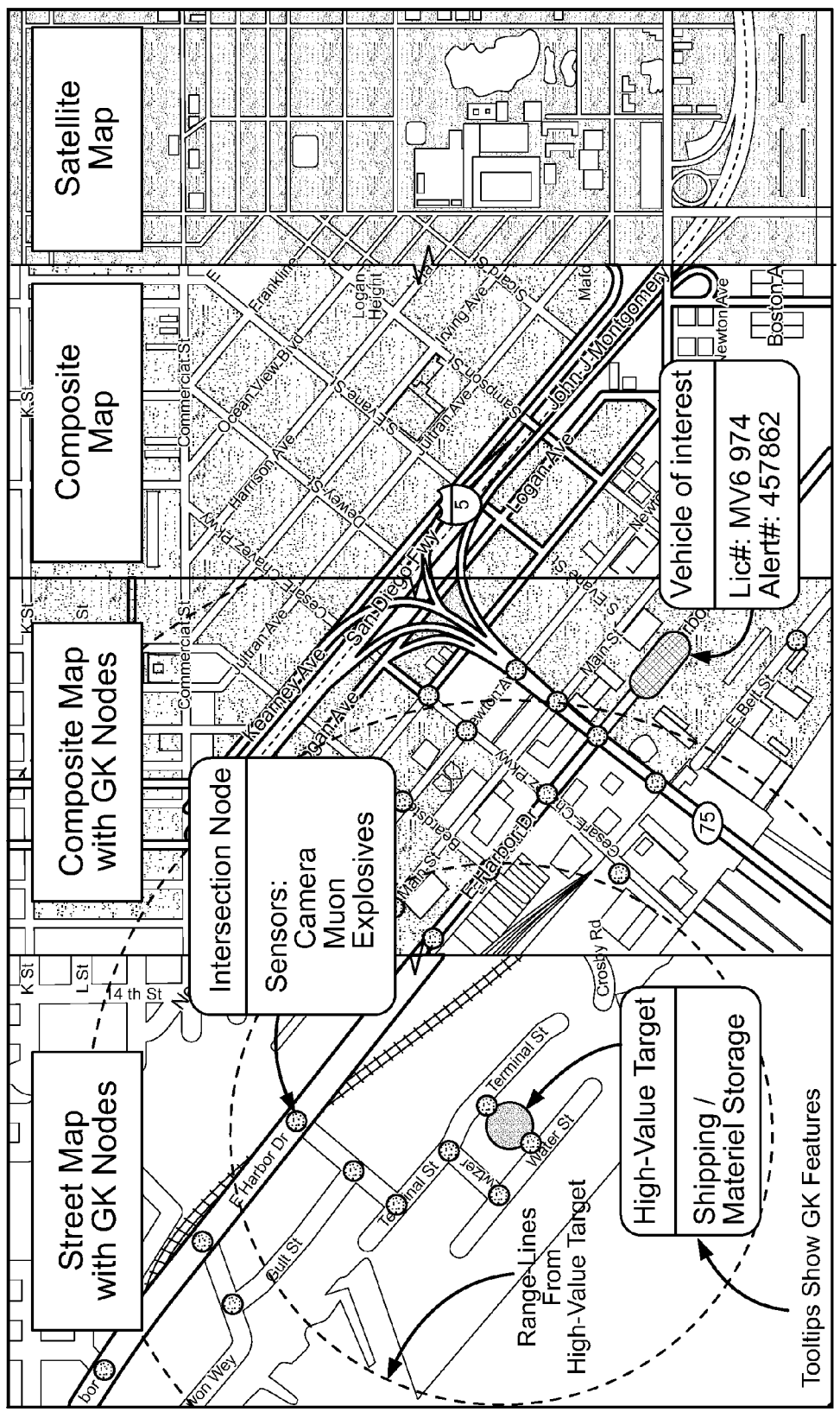
FIG. 14 is an illustration of an embodiment of a portion of a visual display provided in a user interface for a security network.
Figure 15:
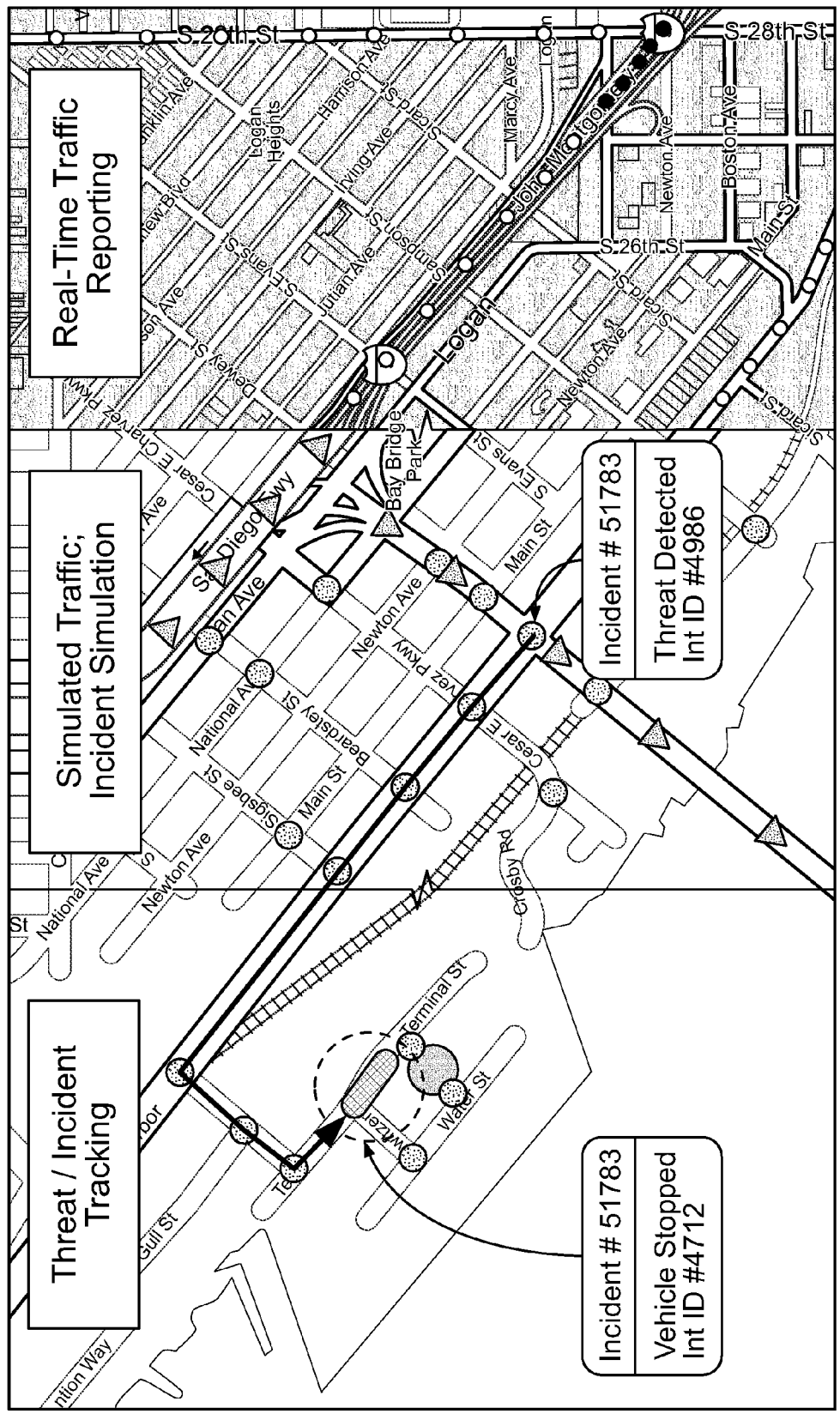
FIG. 15 is an illustration of an embodiment of another portion of a visual display provided in a user interface for a security network.

Examples of various mapping displays are illustrated in FIGS. 14 and 15. Displays may be provided including street maps and/or satellite images. Additionally those displays may include overlays of the stations, or nodes, included in the security network. Icons also may be provided that provide a real-time simulation of movement of a vehicle of interest including information specific to the vehicle. As a further alternative, traffic flow indicators may be provided and combined with the street map or satellite images.

The display modules are configured to create the visual environment on any display device, such as conventional monitors, advanced spherical immersive environment monitors that are customized for the desired visual environment or hand held wireless devices carried by first responders.

Display modules may also be incorporated into remote devices for users that are in the field. For example, any computing device may be utilized by decision makers to assess, command, operate and shape the dynamics of the problem. The decision makers are also able to experiment with various contingencies to test counter-measures, skills and judgments independent of the command center.

The virtual environments created by the display modules are suited for observing, planning, intelligence preparation, real-time visualization of the problem-space with common operational and tactical pictures, intelligence surveillance reconnaissance asset positioning and route optimization, and problem or exercise reconstruction for after action review.

The security network operating environment relies upon an episodic memory to improve response time. As described above the system includes analysis and complex reasoning modules, which may communicate with one or more databases that provides a library of historic and/or theoretical emergency scenarios, or simulation templates. The network utilizes the library of scenarios to compare data to assess a likelihood of occurrence of the particular scenario. After the likelihood has been assessed, the system determines if the likelihood analysis warrants passing those analysis results to other networks on the same or different tier.

The analysis and complex reasoning modules provide continuous investigation of data, digital image watermarking, apply algorithms and decoding performance metrics, apply algorithms that allow for discrete message encoding and other linear and non-linear relationships, and support full processing, cluster searches, association/recall, prediction, statistics, filtering and animated system state monitoring.

The analysis and complex reasoning modules can utilize agent-based computing and control. They are capable of predicting behaviors and applying a confidence value to the predicted behavior based on the correlation with the known simulation templates. The application of a confidence value may occur at any tier level. For example, a confidence value may be applied to a sensor detection analysis, e.g., confidence with which a muon tomography, license plate or facial recognition scan provides a match, or at a larger regional level, e.g., confidence with which a known scenario is unfolding. Furthermore, the analysis and complex reasoning modules are capable of performing an iterative process wherein they make predictions and reassess earlier predictions based on updated data gathered from the sensors and user inputs to adjust an existing simulation template or to create new simulation templates.

The analysis and complex reasoning modules may provide episodic memory at various scales. An example of local scale operation is quickly identifying items of cargo. As mentioned above, sensors 30 at selected locations in the network 10 may include muon tomography sensors. Muon tomography is a technique that may be used to examine the insides of opaque objects using the ambient flux of cosmic ray charge particles (predominately muons). In particular, the trajectory of muons is tracked prior to, and after, passing through an object. Based on the measured scattering of the muons, the density of articles in the object can be determined. Muon tomography may also be used to perform shape identification, with an identified confidence level, based on a defined library of ordnance. Radiological and nuclear materials are generally transported in shielding materials that have extremely high density and therefore are easily detected through muon tomography.

The inclusion of a muon detector in the present multi-tier system 10 may be through a system adapter. The system adapter may provide connection with other sensors, communications to the Network, data storage/retrieval, logging, user interfaces, additional analytics, referential data bases, system diagnostics and maintenance features. The adapter will monitor numerous GK parameters for traits that are out of an expected range and provide for intervention where appropriate. This monitoring includes both system performance and threat analysis. Examples of system performance analysis are monitoring gamma and neutron background values. Examples of threat analysis include performing statistical analysis on stored data based upon shipper, receiver, container contents, and driver ID to identify detector levels that trend away from norms. When an alert is determined by the Muon detector, the Adapter will implement the Alert protocol specific to the installation.

The analysis and complex reasoning modules along with associated databases may be utilized to quickly assess the likelihood of a terrorist threat based on known muon tomography signatures at a local level. For example, through muon tomography an object having a high molecular mass may be detected and the dimensions may be approximated. The high molecular mass may be associated with shielding materials used for radioactive materials. The approximate size and the determined molecular mass value may be compared to known radioactive material sources, through simulation templates, to anticipate a likelihood of the presence of such a material.

Figure 16:
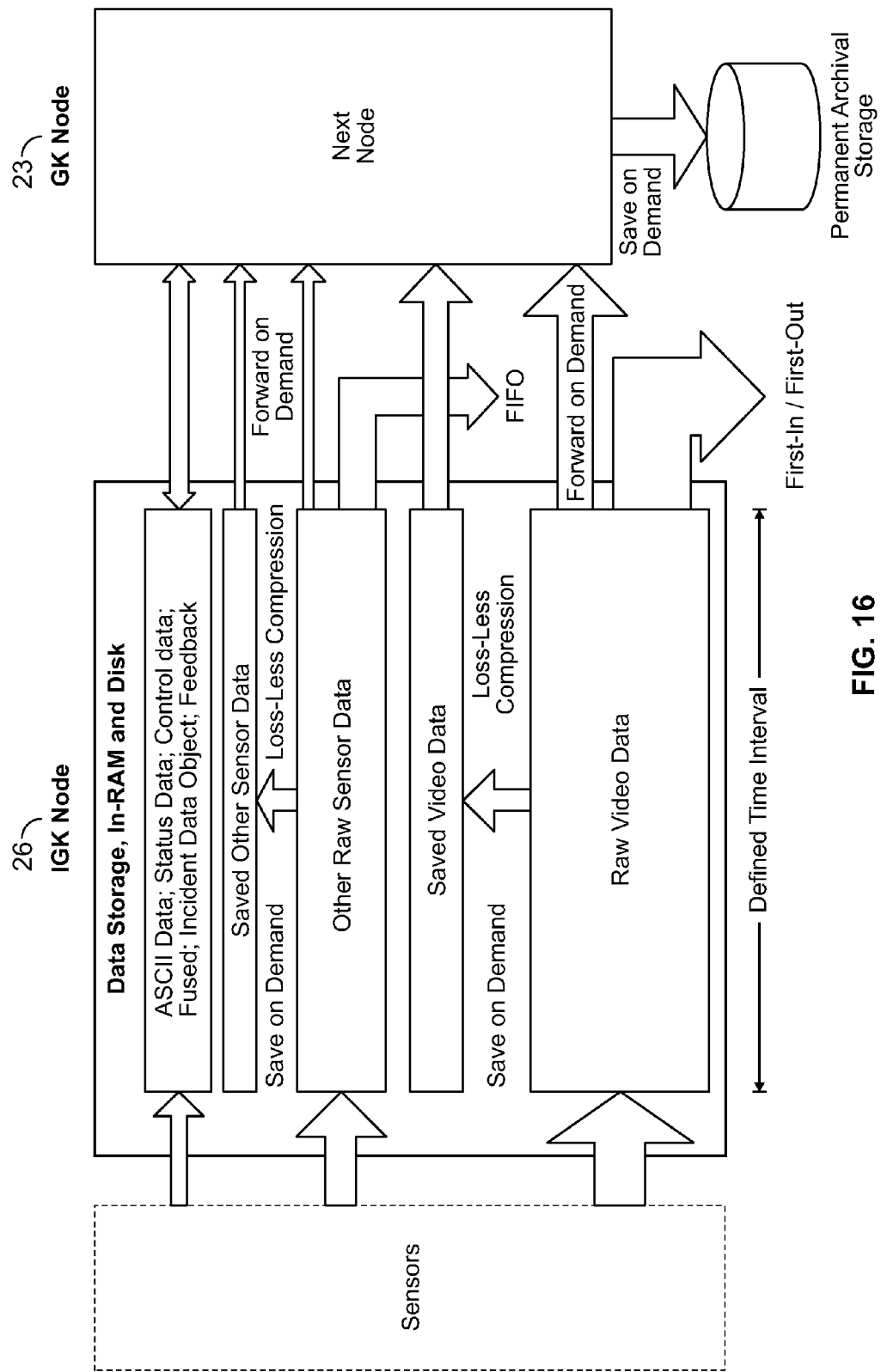
FIGS. 16-19 illustrate examples of data flows in the present system.

The multi-tier network 10 include data storage devices or severs at every node and at every tier to provide a distributed data storage throughout the system. FIG. 16 illustrates the data flows in a local sensor node 26 in the multi-tier system 10. In this example, sensor data is collected from one or more sensors and stored as the raw video data, other raw sensor data, and various data. Part of the data can be forwarded to a corresponding higher node 23, in response to a request, for storage in a permanent archival storage device or server. The data storage devices in the node 25 may be first in and first out (FIFO) memories designed based on specific data retention periods based on the system requirements.

Figure 17:
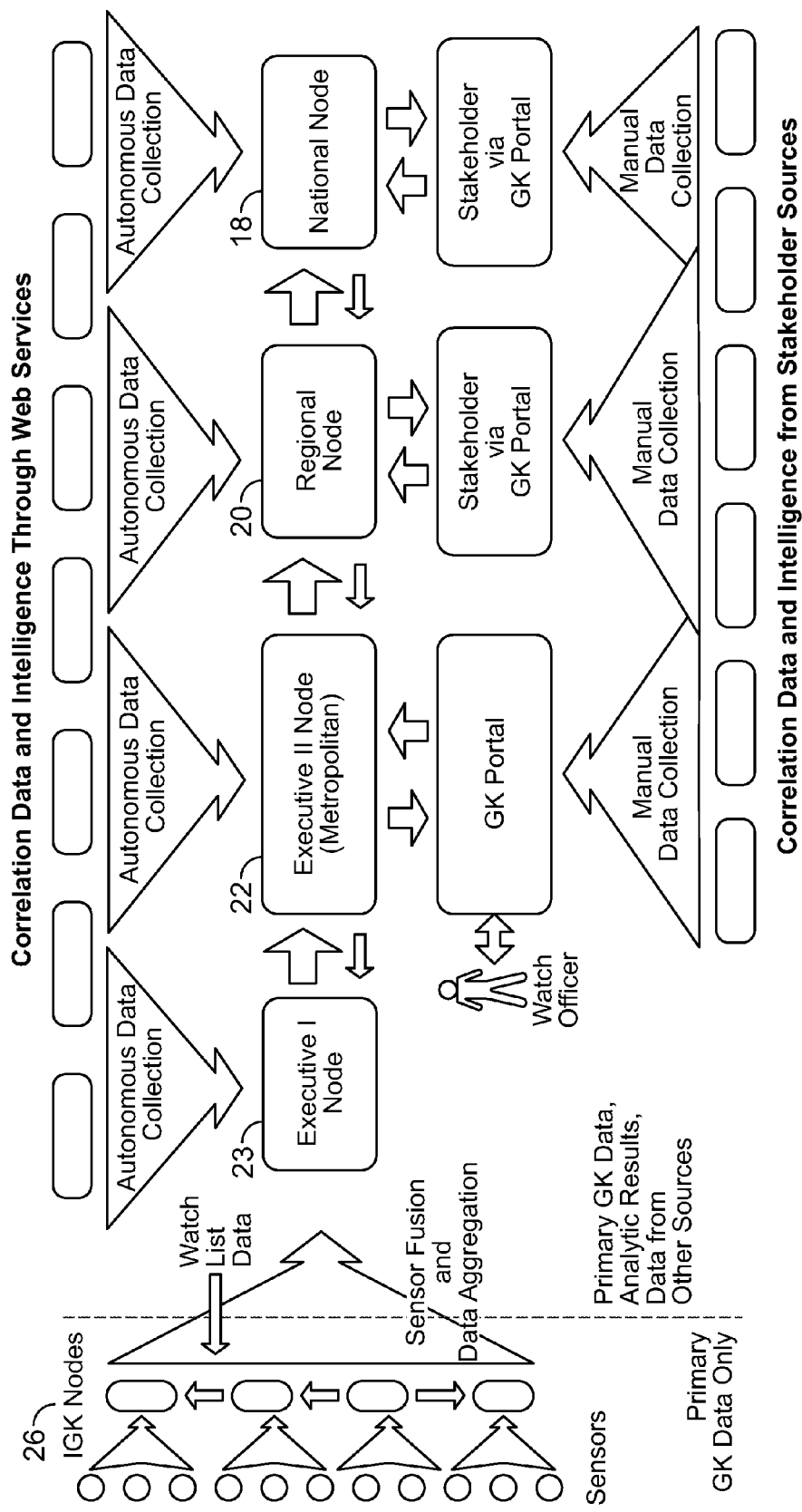

FIG. 17 shows an example of data flows in the entire multi-tier system 10. Initial raw data is collected through sensors, store locally and forwarded to higher-level nodes. Sensor data is analyzed, compared with locally stored data, compared with data of external origin, converted to more useful information, managed as incident tracking, and stored at the close of an incident for historical and forensic purposes. Data also flows into and through the system from outside sources, entering the system as watch-list items, alerts, and in other forms. Data is moved through the system by the system users, operators, and stakeholders in the service of the primary use cases of the system.

Figure 18:
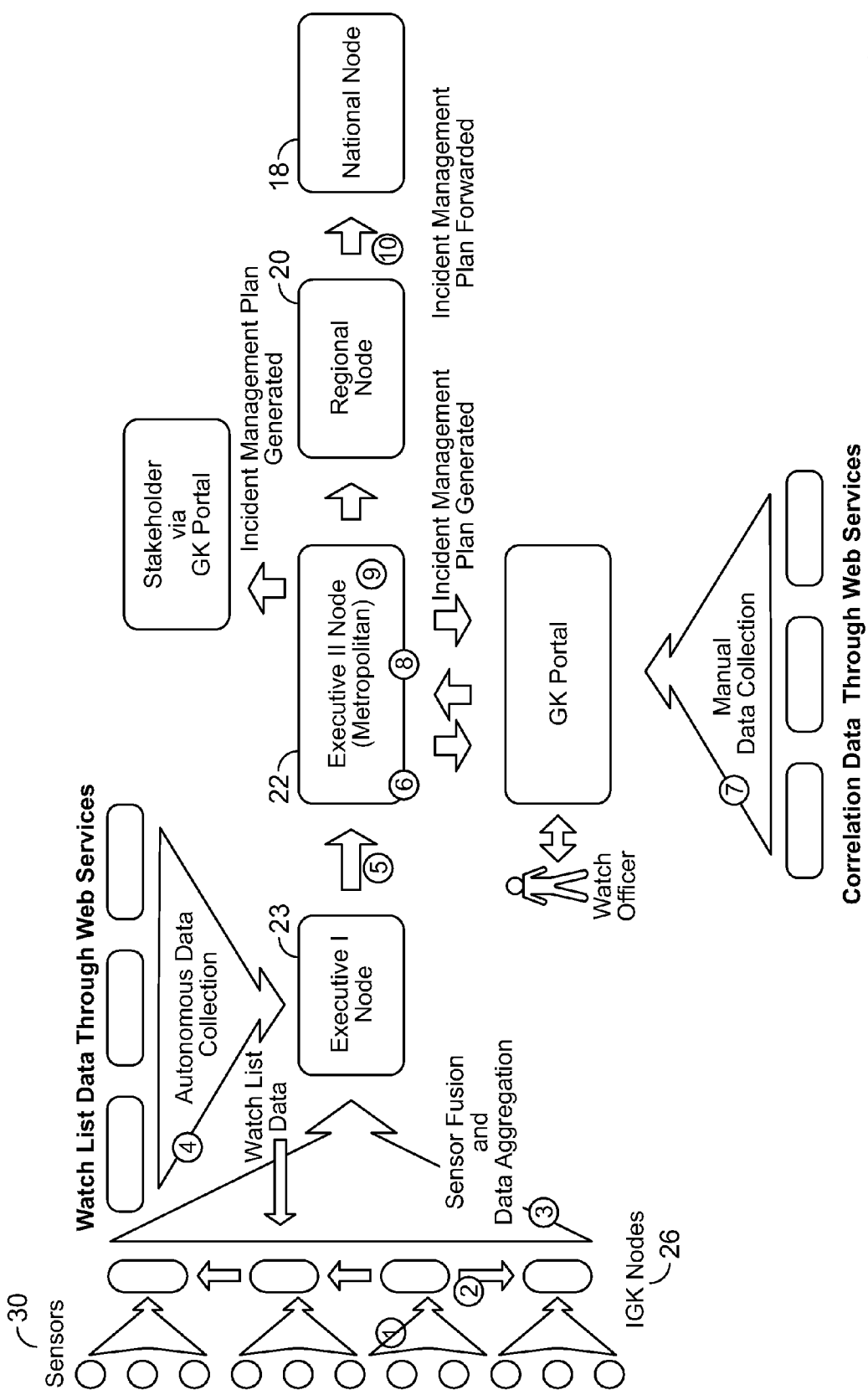

FIG. 18 shows a particular example of data flows in the multi-tier system 10. A sensor detects a known kind of threat at a traffic intersection and forwards the data to its intersection node 26 (1). The node 26 generates an alert, and immediately publishes the alert, which is picked up by its neighbors 26, which go to a higher surveillance level by lowering the detection threshold by a selected amount so that neighbors 26 operate in a more sensitive mode (2). The nodes 26 forward their collected sensor data to their superior tier node 23 (3). This node 23 fuses the sensor data, and performs analytic and reasoning processes on the data (4). The node 23 autonomously collects external data on the vehicle of interest and the person of interest for matching, further identification, and confirmation of the threat.

Next, the node 23 generates a package of data and information, characterized as an Incident, and forward such data to the next higher nodal level, the node 22, for further analytic and reasoning treatment (5). A system watch officer picks up the Incident on a workstation interface, and begins to overlay the autonomous processes with human input (6). The watch officer conducts further resources on external web services available through the Workstation interface, enhancing the Incident information package (7). The watch officer returns the Incident to the node 22 for further action (8). At this time, the node 22 reviews the Incident against appropriate criteria and generates a Response Plan, which is published onto the system (9). The response plan is available to the watch officer and stakeholders.

Finally, the Response Plan is forwarded to all the remaining levels of nodes 20 and the first tier node 18. The further handling of the Incident, including the execution of the Response Plan, is implemented in the system.

Figure 19:
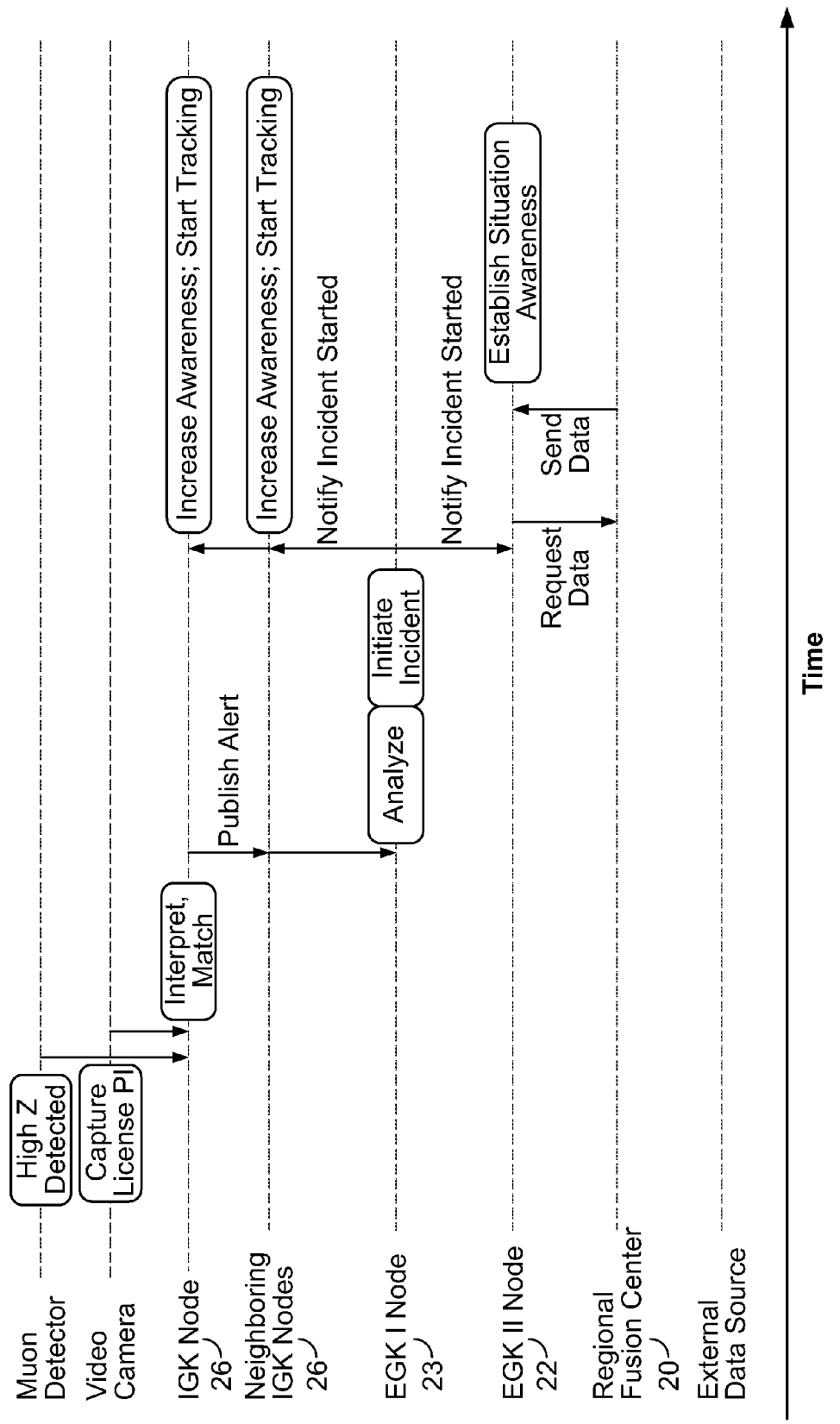

FIG. 19 shows another example of data flows in the multi-tier system 10 when a muon detector identifies a potential threat at a check point. The system responds to the alert by increasing the system awareness at the node 26 where the threat is detected and its neighboring nodes 26. The third tier node 22 also is also put on an awareness state and informs the regional node of the detected situation.

In one implementation, the system can be implemented to in a way in which data is acquired and retained at nodes 26. In this design, a permanent memory device is provided in the node 26 to store the data. That data may be structured at the node 26 or remain unstructured. In itself, the data may be meaningless, however, t is archived in a manner that is searchable by the analytics resident in the node 26. An investigation at another node can call on the end node 26 to search its data for specific information and return meaningful information. For instance, an end node 26 with a video camera may capture, through Automatic License Plate Recognition, all vehicles that pass thru it's field of view surrounding a nuclear power plant and locally store this data in flat files or a relational data base. An investigation occurring at another node may be interested in knowing if the end node had encountered a particular license plate. The investigative node can send a query to one or more nodes seeking hits on the vehicle license plate. If a hit occurs, the node might return the date, time of the occurrence along with video of the vehicle and passengers. Similar distributed data acquisition, storage, analytics and communications could occur with facial recognition, vehicle recognition and other behaviors and objects of interest. A system could be configured to allow the pass-thru of data to other nodes. In that system configuration the data storage, analytics and communication could occur at multiple levels. The system might also be configured to maintain the data isolated from other GK Nodes, taking on meaning only within the context of an investigation or criminal alert. This configuration could be implemented to maximize the privacy protections of the public.

Figure 20:
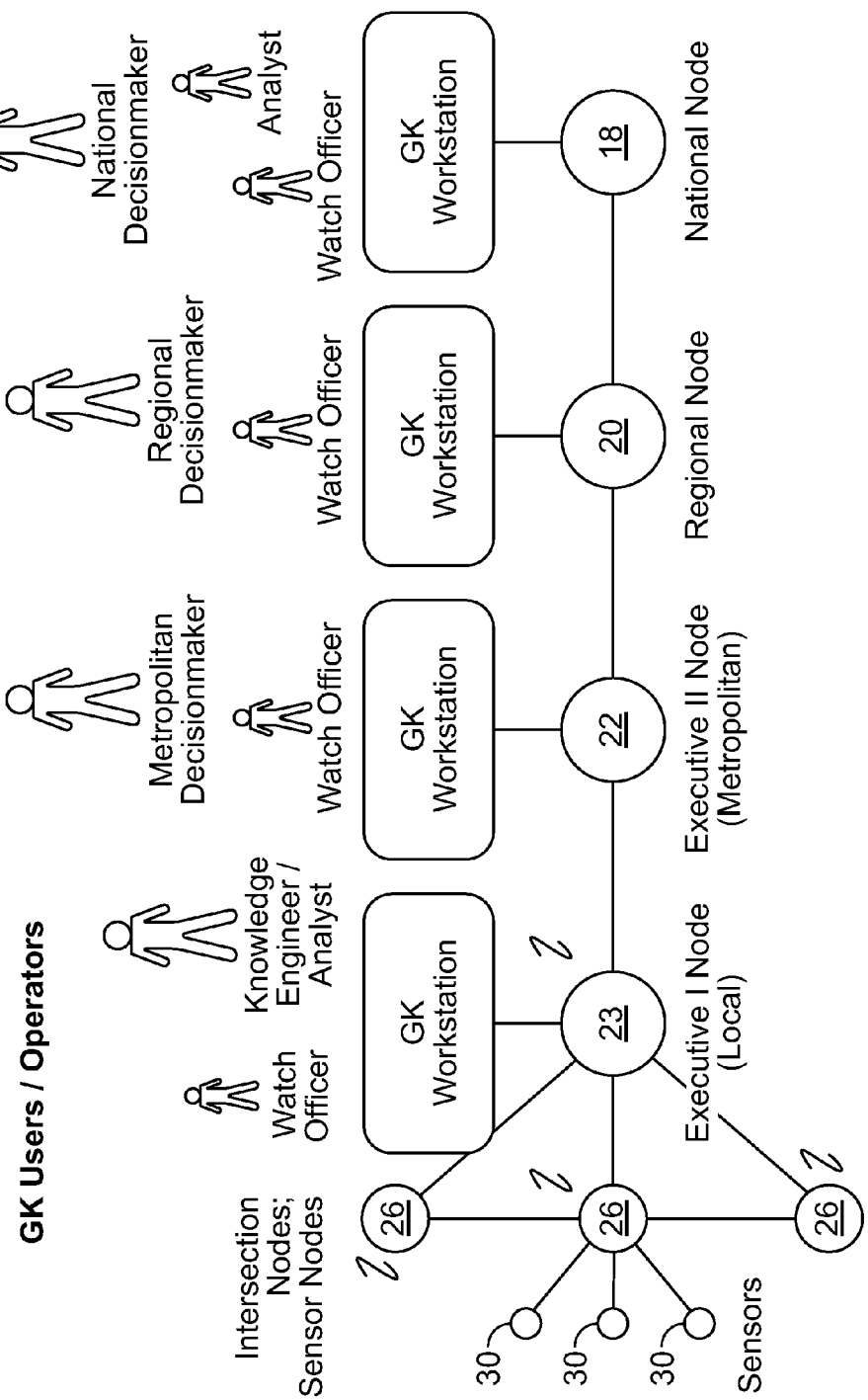
FIGS. 20 and 21 show examples of users in the present system.
Figure 21:
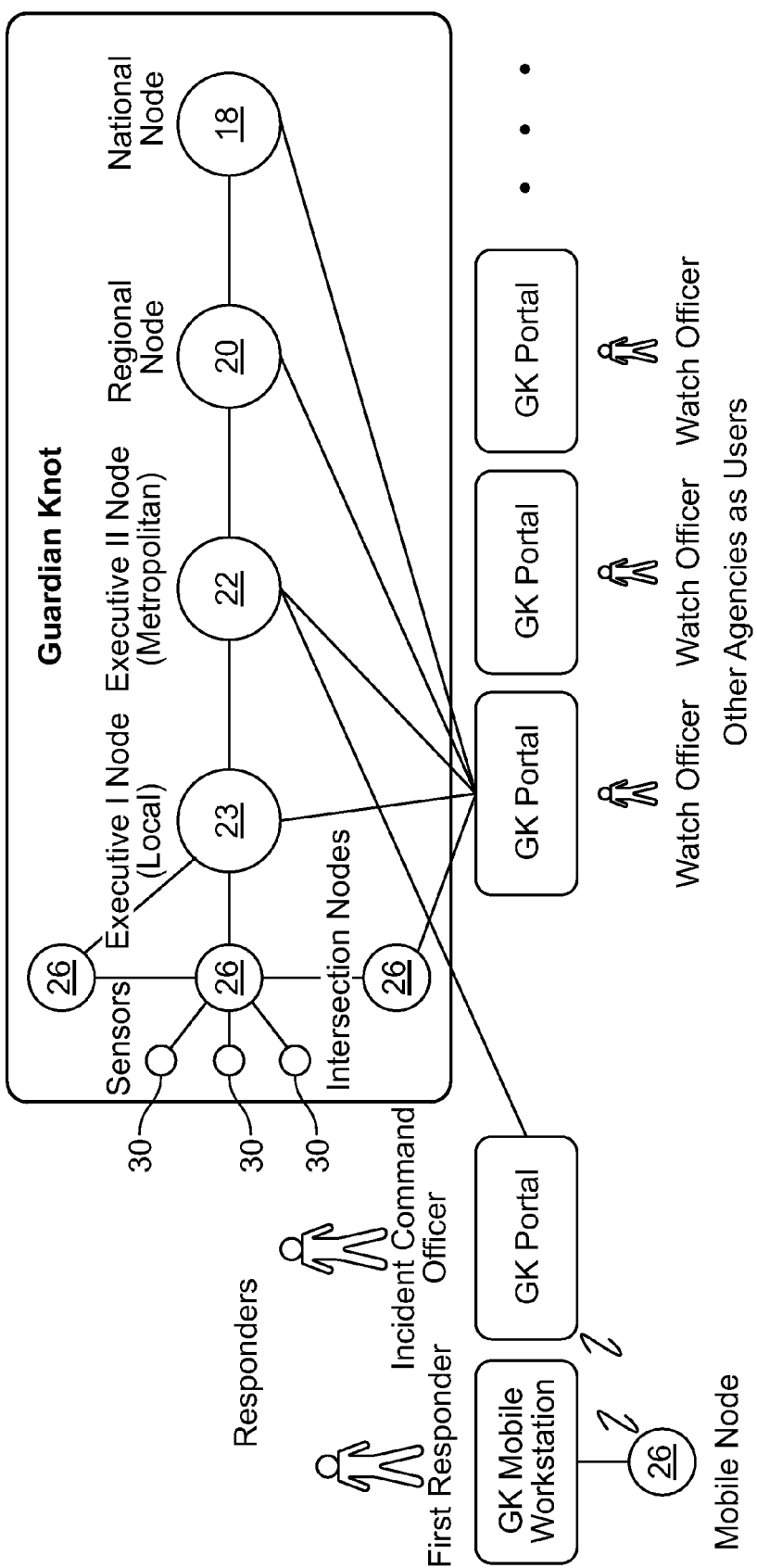

Notably, the multi-tier system 10 is designed to provide automated data collection and analysis and to produce automated system warning and certain responses. In addition, the system 10 provide user interfaces to allow various system operators, decision makers and other system users to interact with the system 10. The system software may be configured to allow a decision maker to override certain automated system operations within a given authority level. FIGS. 20 and 21 show various system users at different tier levels.

FIGS. 22-25 shows different operational scenarios in a multi-tier system 40 to illustrate the system operations. Operation of a security network 40 will be described in relation to a theoretical event. A portion of security network 40 is illustrated in FIGS. 22-25. Security network 40 is a first tier network that includes a plurality of second, third and fourth tier networks. All of the sub-networks operate on a common operating environment but are assigned tier-specific tasks.

As described previously, second tier networks may be regional networks. In the present embodiment, second tier networks, such as regional networks 42, 44 and 46, are included and encompass portions of third tier networks, such as corridor networks 48, 50, 52 and aqueduct network 54, and a plurality of fourth tier networks, such as local networks 56-72.

Regional network 42 encompasses local networks 56, 58 and 72, and a portions of corridor network 52 and aqueduct network 54. Regional network 44 comprises local networks 60, 62, 64 and portions of corridor networks 48 and 50. Regional network 46 encompasses local networks 66 and 68, and portions of corridor network 50 and aqueduct network 54. It should be appreciated that the local networks may be organized around any local attribute. For example, local networks 56, 58, 60, 64 and 68 are generally organized within local roadways and utilize roadway traffic controllers to provide the fourth tier stations. The local networks may also be organized at places of particular interest, such as a downtown, e.g., local network 62, or a sports stadium, e.g., local network 66.

Figure 22:
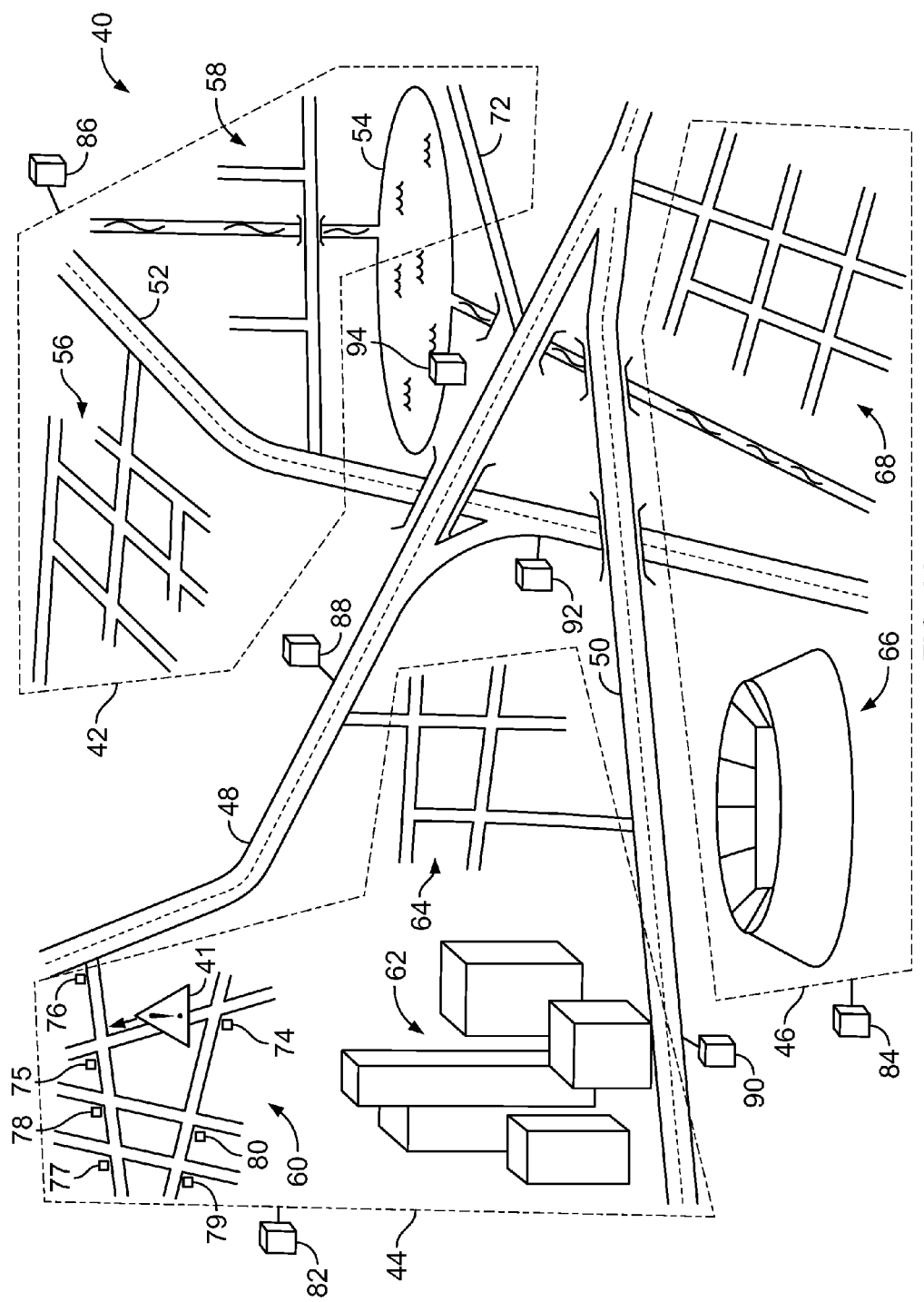
FIGS. 22-25 are schematics illustrating a scenario in which a threat is detected and tracked by a security network.

Referring first to FIG. 22, in one scenario a detector agent at fourth tier station 74, an intersection node, detects a vehicle carrying a hazardous chemical, e.g., a recognized threat or vehicle of interest (VOI) 41, with high confidence by analyzing data collected with a chemical sensor at that station. The detector agent classifies the material based on data samples and determines the confidence level based on the data gathered and its similarity to known simulation templates, i.e., it relies on episodic memory. The chemical classification and confidence value is communicated to higher order agents, i.e., components in higher tier sub-networks and the national command center, so that higher level situation awareness may be initiated.

Additionally, an alert is distributed to other stations on the same tier such as stations 75 and 76, which are in a forecast path of travel of VOI 41, so that the other stations may continue to collect specific data types. For example, after station 74 has determined the presence of a chemical, stations 75 and 76 may focus on other aspects such as facial recognition of the occupants or physical attributes of VOI 41 such as decals or other markings or those stations may be specifically requested to confirm the chemical detection. Additionally, the nearby stations may be utilized to alter traffic patterns to slow the progress of VOI 41 and/or to divert traffic flow away from VOI 41. As a still further additional feature, the sensitivity of any of the sensors at stations adjacent or nearby station 74 may be modified in response to the initial detection of the chemical or any other potential threat.

In the event station detects the presence of the chemical with low confidence, it may employ the other stations in the same tier to gather additional information in an attempt to increase the confidence level. For example, station 74 may detect a chemical but based on the concentration detected it determines with low confidence that the chemical is a threat. Such a reading may be a result of a reduced scan time due to the traffic signal timing. Station would enter a log entry indicating that it was unable to complete the analysis and it would send a request to neighboring stations 75 and 76 to change the traffic flow timing to slow the progress of VOI 41 so that chemical sensors at those locations may reassess the concentration of the chemical. The request may also be directed to additional sensors such as a video camera so that facial recognition or license plate scans may be utilized to correlate gathered information with watch list databases, such as a database of people with known affiliations with terrorist networks or a database of stolen cars.

The detector agent queries additional sensors integrated at that traffic intersection, (e.g., video, weight sensors, velocity sensors) to gather additional information and to create a record of even tags. Additional information collected may include the weight of the vehicle to determine the quantity of the chemical, the license plate number to correlate with motor vehicle records, video data to determine whether the vehicle is carrying a person on a national or local watch list, and data related to direction and speed of travel.

After additional data is retrieved, detector agent of station 74 continues to utilize its episodic memory capability and the integrated analysis and complex reasoning modules to match the data to simulation templates. In this example, station 74 may determine that given the type and quantity of chemical and vehicle occupants a likely scenario is that the chemical may be used as an explosive or as an environmental contaminant. Station 74 communicates this information in the form of an alert to adjacent stations, such as stations 75 and 76 and the regional command center 82. It should be appreciated that such a determination may be made at a higher tier command center if desired. For example, station 74 may pass the initial alert of the chemical detection to a higher tier command center and that command center may correlate the chemical detection with likely scenarios through a higher level episodic memory function.

Regional command center 82 relays the information to a national command center as well as adjacent regional command centers 84, 86 and corridor command centers 88, 90 by publishing the alert on a system-wide knowledge message board. The national command center, as well as nearby regional command centers 84, 86 and corridor command centers 88, 90 are designated in a subscriber list that results in the alert being disseminated to them through the message board.

At the regional level, command center 82 is tasked with predicting likely routes, such as by identifying locations of interest, or high-value targets. For example, command center 82 may recognize that a terrorist carrying a high quantity of the chemical may target a downtown area of a city, a nearby sports stadium, or a nearby water aqueduct. In the present scenario, regional command 82 determines that threat 41 is moving in the direction of local station 75 and assigns a lower probability that the threat 41 is targeting downtown 62.

In addition to providing forecasting of likely routes and scenarios, various command centers may be tasked with looking to past events leading up to the current threat. As a result, the network is capable of cross-correlating local, regional, National and/or International data to establish linkage and incident relativity. For example, the national command center may initiate data-mining by searching credit card databases, bank record databases, travel records, ATM transactions, known affiliations and phone records, among others, of the identified occupants. On a regional or local level, the security network may query the regional and/or local sub-networks for additional information such as past records of detection of the chemical at lower than threshold levels.

The data-mining activities may be used to build a forensic evidence log and to alert the system to related threats in other locations. For example, travel records may indicate that the occupants have traveled to other major cities in the recent past. Phone records may indicate that the occupants have also been in phone contact with other people located in those cities that are also included in a watch list. Through the combination of that type of data, the system may forecast a higher likelihood of a similar event transpiring in those other locations. As a result, the system may reduce the threshold level associated with the detected chemical for publishing an alert in those cities and reconsider past data, such as lower than threshold detections of the same chemical as that carried in VOI 41.

Given the early warning by command center 82, command centers for the regions associated with the likely targets, in combination with a national command center, may begin staging responses and preemptive measures, such as by warning responders and altering traffic routes. Because the exemplary system utilizes traffic controllers at the local level, thoroughfares that are designated paths of responders may be kept clear by changing the timing of the traffic signals and traffic may be diverted away from VOI 41. The staging of the response assets is used to reduce response time of responders. Additionally, traffic controllers in the forecast path of VOI 41 may be timed so that the progress of VOI 41 is hindered to provide first responders additional time to stage and/or engage VOI 41.

Stations not directly in the path of VOI 41 may be utilized to pool processing resources to reduce the overall processing time required for data gathered by stations that are directly in contact with threat 41. For example, video recognition processing of video data gathered at station 74 may be distributed over other stations included in local network 60, such as stations 77, 78, 79 and 80.

Figure 23:
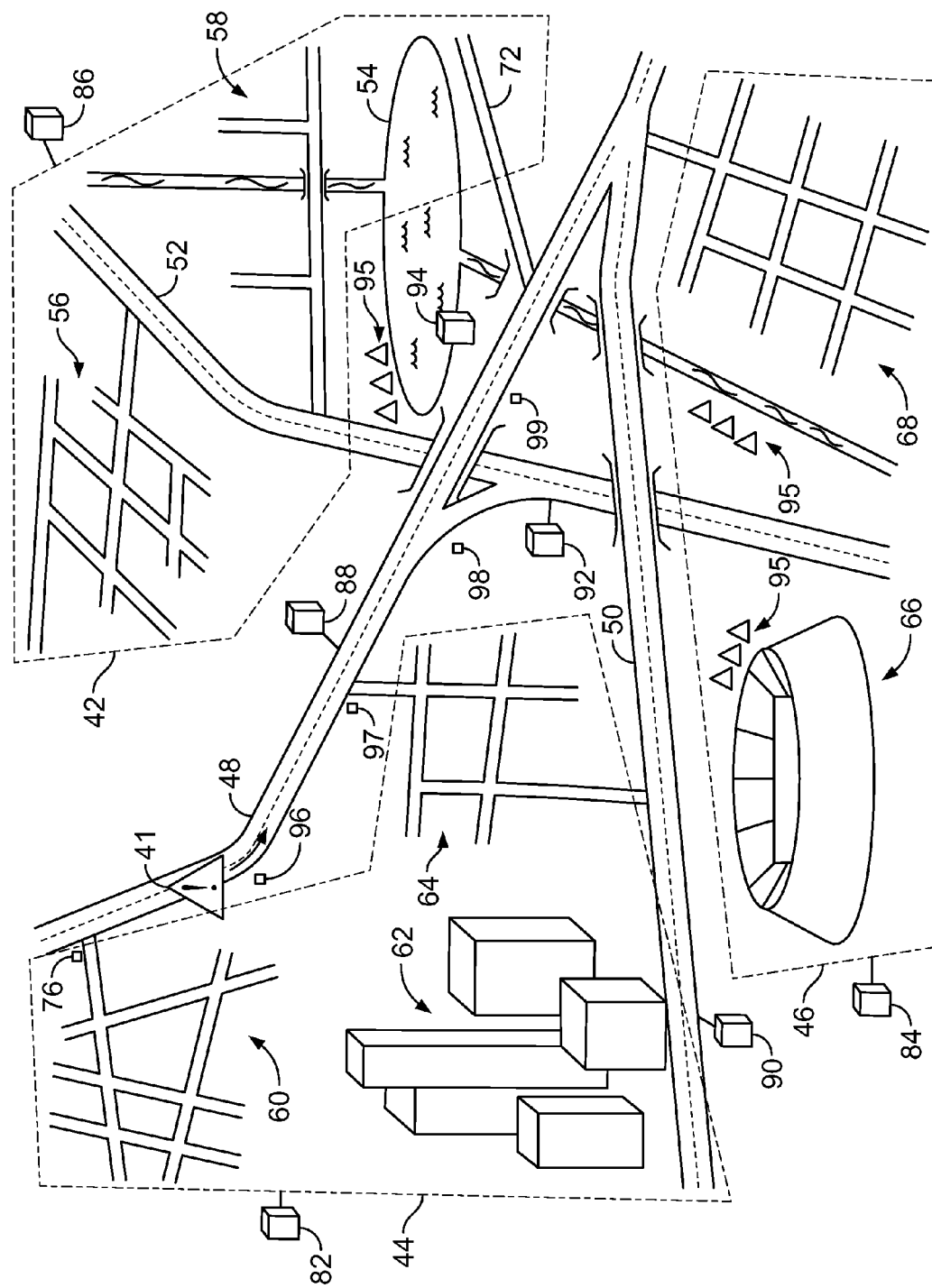

Referring to FIG. 23, security network 40 continues to track threat 41 and has determined that threat has exited local network 60 and is now traveling through corridor network 48 at a high rate of speed. Communication between local network 60 and corridor network 48 is simplified because the communications are provided with a common communications protocol and station 76 of local network 60 is also a station, or node, included in corridor network 48.

Corridor command center 88 of corridor network 48 performs third tier assigned tasks, such as predicting likely paths based on known conditions through the corridor. Command center 88 may also determine and recommend response routes to the national command center in addition to command centers of sub-networks included in the likely path of threat 41. For example, command center 88 may send warnings to command centers 86, 84 and 94 that threat 41 is approaching at a high rate of speed and is likely targeting locations within their sub-networks. Each of those adjacent command centers may also query within their own network whether any additional known terrorists are traveling through their networks on a convergent path with threat 41. Command center 88 also continues to gather additional information and to track threat 41 utilizing corridor stations 76, 96, 97, 98 and 99.

Figure 24:
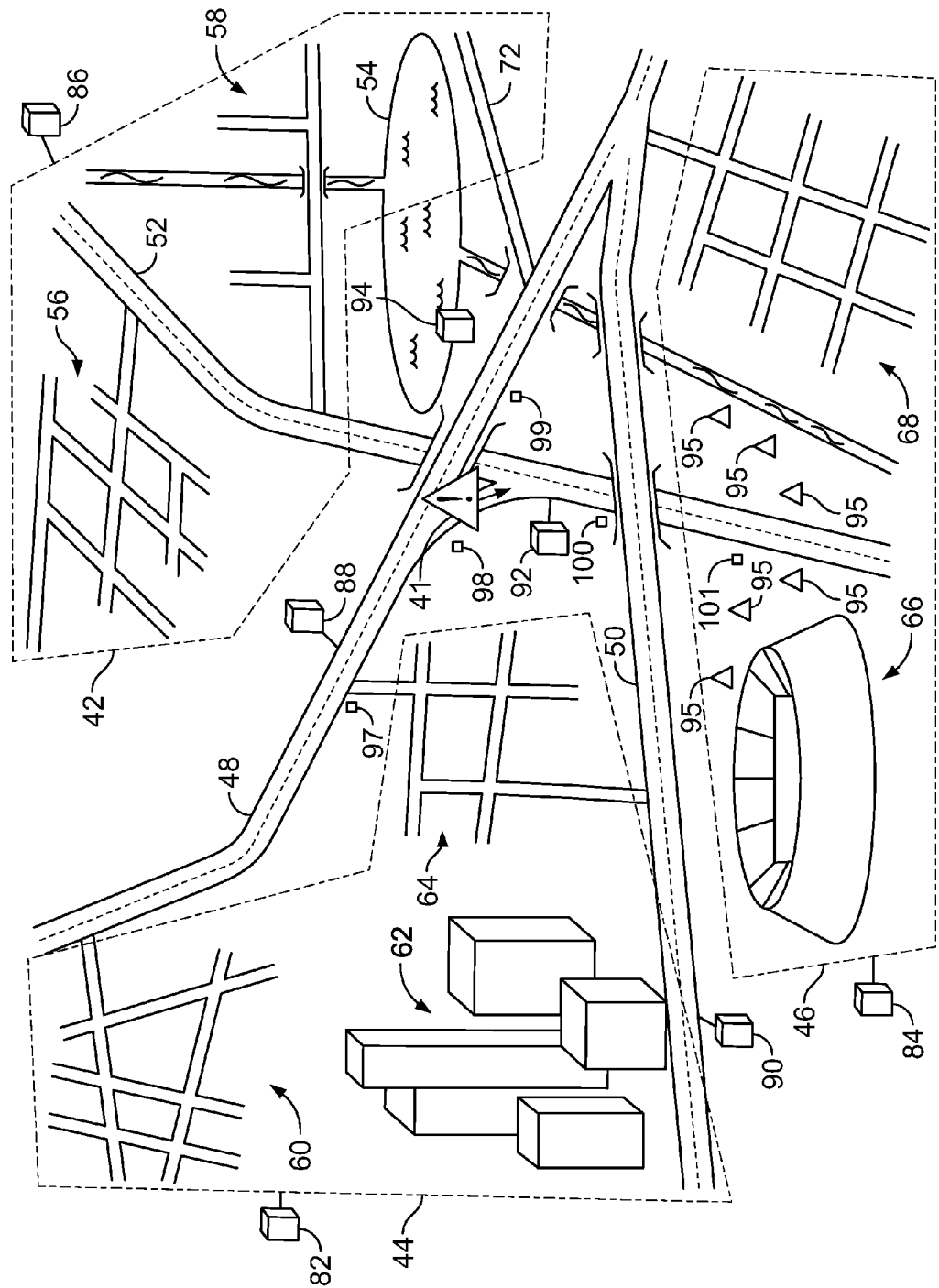

Referring now to FIG. 24, corridor station 98 of corridor network 48 determines that the path of travel of threat 41 has changed so that threat 41 has entered corridor network 52.

Based on that change in direction, corridor command center 88 may alter the prediction initially provided by regional command center 82 to reduce the likelihood that the aqueduct is the targeted location and increasing the probability that the sports stadium is the intended target of threat 41. Corridor command center 88 relays this updated prediction to the national command center in addition to the adjacent regions and corridors so that the processing power of those sub-networks with having a lower probability of attack may be reallocated for support or for normal operations.

Figure 25:
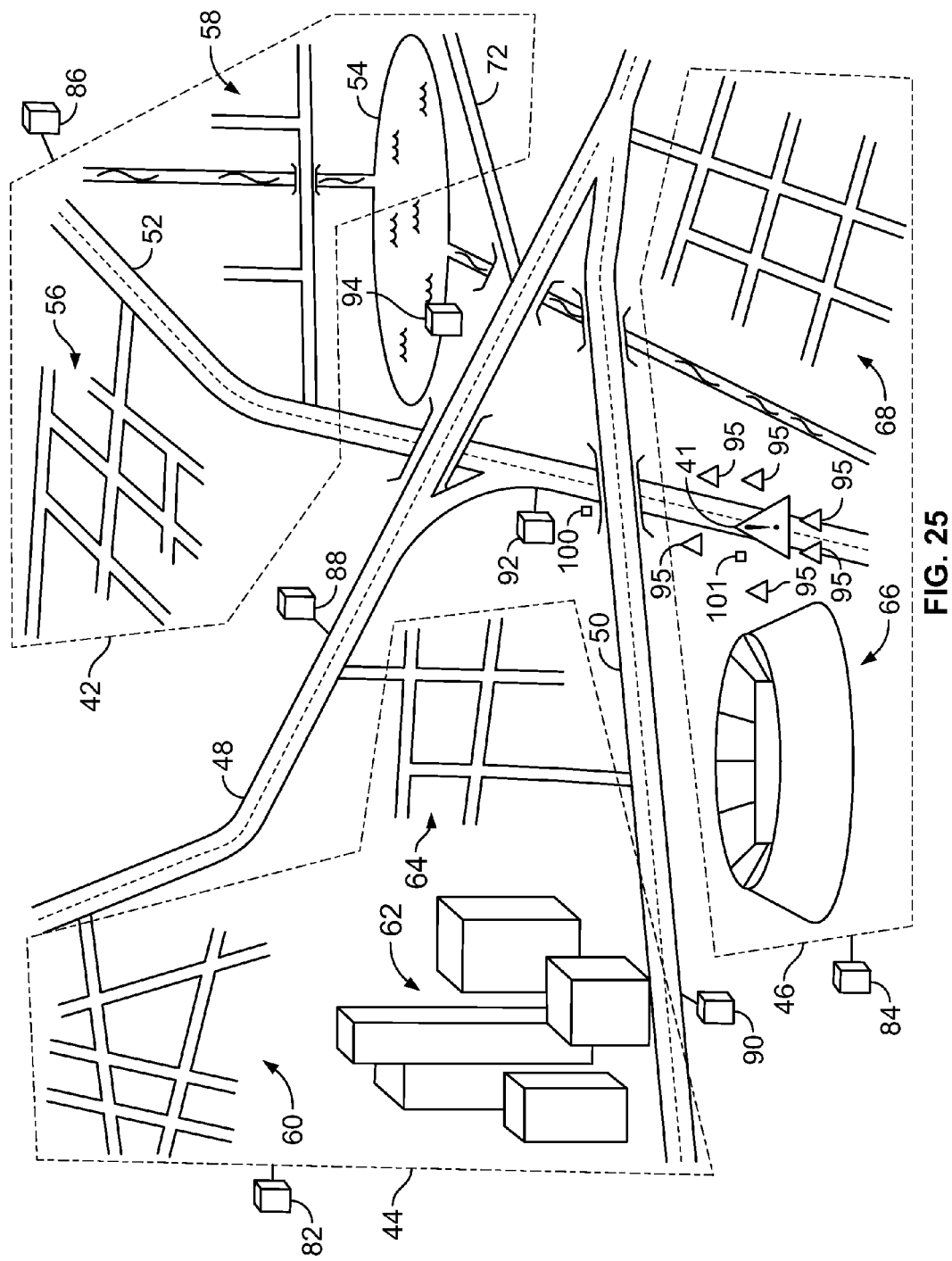

Additionally, the updated prediction made by corridor command center 88 may be utilized by regional command center 84 and corridor command center 86 to initiate the staged responses and preemptive measures. As previously mentioned, after the sports stadium, was identified as a possible target of threat 41, command center 84 began to stage a response and preemptive measures. As the probability of attack is increased based on the path of threat, command center 84 initiates the response, as shown in FIG. 25, and because the early warning allowed for the staging of the response, the response and preemptive measures may be more quickly deployed to contain threat 41.

The ability of public safety and service agencies to talk within and across entities and jurisdictions via radio and associated communications systems for exchanging real time voice, data and/or video is a major issue in security networks. Because the security network of the present invention utilizes a common operating environment that allocates tasks based on the tier of the network and utilizes common communication protocols, communications are simplified and are not limited by borders and jurisdiction.

Although, an exemplary embodiment of the security network has been described that utilizes existing road traffic controllers, it should be appreciated that any network may be used. For example, dedicated network may be used in combination with existing networks that are primarily utilized for other purposes.

Figure 26:
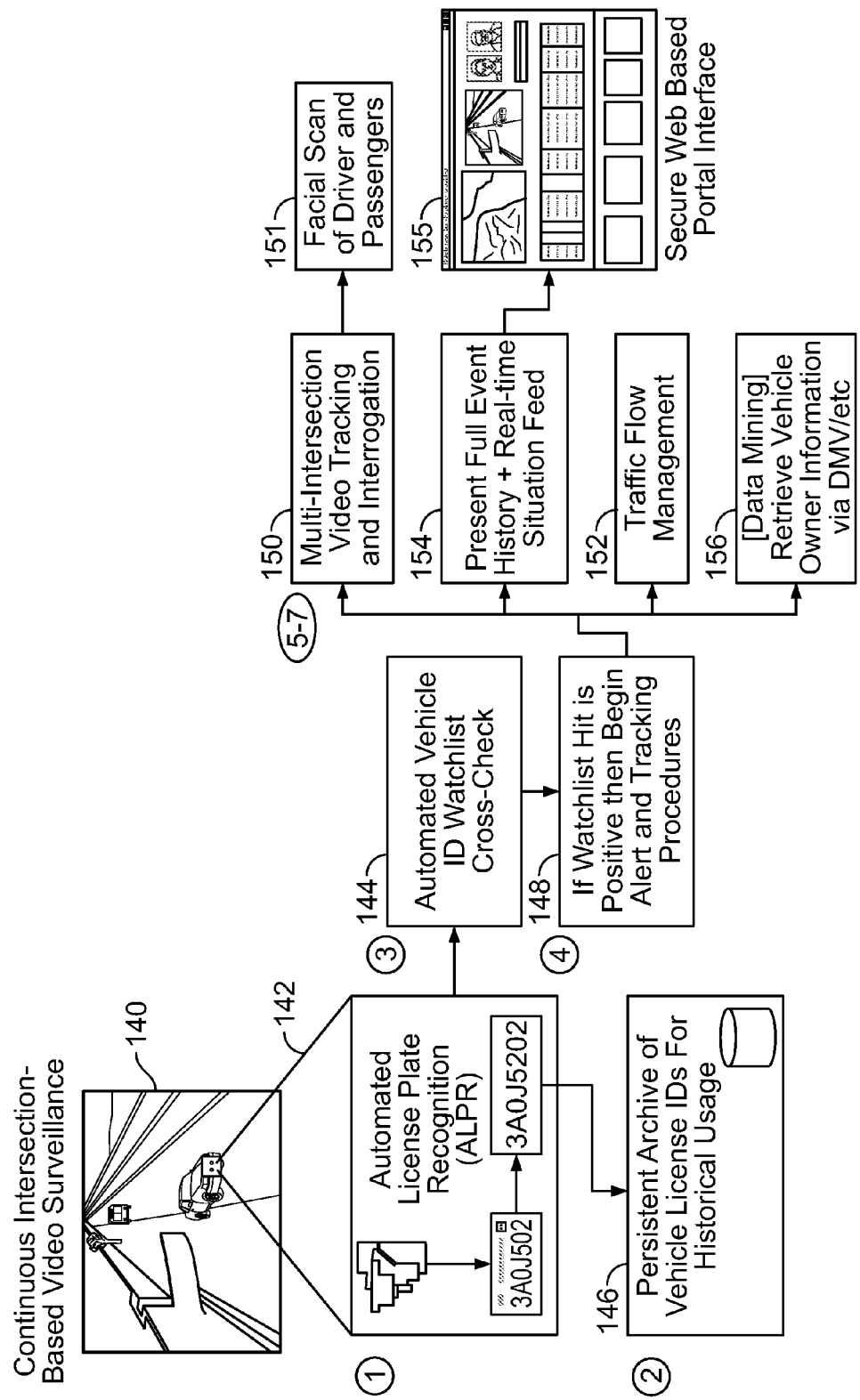
FIG. 26 is a schematic of a process of data collection that may be utilized by a security network.

Referring to FIG. 26, another scenario will be described. The scenario illustrates a method of using a security network for monitoring a roadway intersection. In a first step 140 an intersection node collects continuous video surveillance. The video surveillance is utilized to perform automated license plate recognition, as shown in step 142, by cross-checking the vehicle identification with a watch list, as shown in step 144. Concurrently, an archive is maintained in step 146 of all the vehicle license identifications that are made by the intersection node to provide a historical record that may be utilized by the security network for data-mining if required.

In the event a match is made between a license identification and an identification included on a watch list, alert and tracking procedures are begun in step 148. The alert and tracking procedures may include a plurality of parallel activities. For example, multi-intersection video tracking and analysis 150 may be begun, which may include facial scans of the driver and passengers 151. Traffic flow may be managed 152 such as by altering the traffic controller timing to slow the vehicle of interest or to divert traffic flow away from the vehicle. Additionally, a user display 154, 155 may be provided that presents event history, including the triggering event, and real-time situation feed and data mining results from data mining operations 156. As described previously, data mining 156 may include retrieval of vehicle owner information via motor vehicle records, credit card records, bank records, phone records, travel records, etc. All of the information gathered by the intersection node is passed into the security network so that a preemptive plan may be constructed and executed.

The present multi-tier system can be viewed as a large, complex state machine and it may be difficult to specify a unified system state in its entirety at any one time. Nonetheless, on every useful scale of the system structure, enough of the system state is known, and is sufficiently accessible, to support effective operations. The state of the system is defined as the array of values of the system's state variables at an instant in time.

Some of the system's state variables are especially intended to face outward, to express collectively the key conditions of the system. These variables are used both as critical controls and control markers in operations, as well as indicators of system health and other conditions.

These special outward-facing state variables are expressed through human-accessible and system-accessible interfaces. Collectively we call these variables, as expressed through these interfaces, the internal system awareness.

In order to operate as intended, the system may also need to take into account a range of external factors in its operating environment, or in the world at large, and reflect them for its own use as an array of external state variables. Collectively these variables, expressed through appropriate interfaces, represent general situation awareness. The internal system awareness, and general situation awareness can be implemented through a unified set of interfaces.

In addition, the system can be operated based on specific situation awareness related to the state of some external situation the system is designed to observe, or monitor, or analyze, or react to. Specific situation awareness is typically described in terms of its scope, such as local situation awareness, or large-scale situation awareness.

Consider an example of threat detection. A threat is detected directly by a sensor at an intersection node. This is expressed as a set of specific system variables locally. An alert is generated, an incident is initiated, and a cascade of system variables are triggered to specific higher values. For example, a variable we may call surveillance level is raised to a higher level, and the system begins scanning neighboring locations more frequently than before, and saving scan information longer. The threat is published locally, and propagates to an executive node which takes note of it. If the threat is sufficiently great, the geo-spatial scope of the incident is increased. The scope of the threat is evaluated by the system and perhaps a human watch officer, and a determination is made as to which level of the system should own the incident as it evolves. A comparison is made to information carried as part of the system's general situation awareness, in the process of shaping a response to the incident. As the incident progressed, the system performs analytics and reasoning—based on these values of variables—and creates a specific situation awareness that applies to the incident. And so on, each aspect of the operation carried by system variables, the awareness of which can be assessed by the system itself, or by an external system, or by human operators at any time. In the case of this incident example, the threat may be deterred, and the values of many variables may return to their prior values.

In one implementation, the following parameters may be included an inventory of some of the key aspects of system awareness:

Temporal Processes: Heartbeat, Large-scale heartbeat, and Time-synchronization.

Steady-State Processes: Data collection and Data flow and storage.

Events and Episodic Processes: Sessions, Scans, Trackable Events, Incidents and Participation in externally managed events.

Scoping of Awareness: Geo-spatial scoping, Nodal scoping, zonal awareness, Scoping relative to a threat detection, and Scoping of notices and alerts.

Selective Awareness: Qualitative filtering, Quantitative filtering, Passive Filtering (use of system thresholds), and Active Filtering (set by a user).

Surveillance Level: Indexed value, based on a useful scale.

Surveillance Scope: Geo-spatial scope, Activity scope, System scope (at higher levels may invoke data flows from outside the GK system).

Threat Type and Level: Qualitative and quantitative assessment of threat detected by the system.

Alert: a system flag triggered by detection of a threat, or a human user in response to a threat or other condition. Alerts can be used to collectively trigger other variables to higher indexed levels as a group.

Incidents, and Incident Level: An incident is a managed process, initiated automatically upon detection of a threat, or initiated by a system user in response to some criteria. In GK, incidents are managed and tracked in compliance with the response planning and management processes defined by the National Incident Management System (NIMS).

Incident Ownership: An incident is owned by the system at some level, or by an internal system user, or by an external stakeholder or system user. Ownership of an incident depends on incident scope, and is nature. Guidelines for incident management and ownership are also defined by NIMS. Incidents of sufficient importance are managed from an Incident Command Center, which may or may not be co-located with a Regional or National Fusion Center.

Maintenance and Administrative Awareness: System Health, Administration of nodes, Administration of network processes and User administration.

System Security Awareness: Users, user authentication, user authority, Network security and Hacker resistance.

Resource Availability: Data storage resources, Computational resources, Analytic and reasoning resources, External resources and Stand-by resources.

General External Awareness: World View, Awareness of specific kinds of outside events, and Pass-through awareness from participating stakeholders and subscribing agencies.

In another aspect, the present multi-tier system is designed to process information autonomously, collecting data through its highly distributed multi-modal sensor network and perform analytic and reasoning processes on such real-time sensor data. This real-time data is correlated with historical and intelligence based data from multiple sources to present actionable Response Plans for autonomous or semi-autonomous initiation and execution.

Distributed intelligent software agents are embedded throughout the multi-tier architecture to perform persistent complex and collaborative reasoning on the real-time sensor data that is being ingested by the system. The intelligent agents are programmed with specific roles that reflect a knowledge processing hierarchy and allow for cooperative processing of sensor events as well as processing of higher order threat events that resulted from logical inferences of data.

For example, FIG. 10 illustrates the distribution of information processing with the lowest level sensor nodes 26 applying analytics on the incoming data and the superordinate nodes 23, 22, 20, and 18 applying a progression of analytics and complex reasoning to derive information and knowledge within the upper tier layers of the system. The respective agents monitor for threat characteristics and patterns within the data/information and communicate with adjunct agents that can further the information into various levels of situation awareness. The system can be used to continuously build up and advance situation awareness and the confidence of the derived knowledge and incident forecasts.

The system can selectively and logically maintain a repository of data/information determined to be of high value as well as information that are directly correlated with an incident. This episodic memory allows for historical reasoning to be performed in support of automated and human guided forensics. For example, the system end nodes can maintain a database of scanned vehicle license plates for vehicles traveling in proximity of high-value target areas and other select geo-corridors. Hence, when a vehicle becomes an investigative or criminal interest, e.g., for being involved in a high threat sensor incident, the license plate database can be searched to determine if that vehicle was previously geo-located at a potential target location or other locations of interest. The license plate search may be accomplished in parallel at any number of selected end nodes. Additionally, information about the vehicle of interest can trigger multifaceted searches of public and secure data bases to qualify the threat level and to identify associated threats. This information can be used in conjunction with predictive reasoning methods to narrow the search space and more accurately forecast and track the elements involved in an incident.

The present system can be configured to apply adaptive system logic within several contexts. Adaptive logic is used to shift threat reasoning thresholds as a result of both local and regional events. This allows for the system to be more sensitive to sensor reports as needed and as a function of the overall threat "climate." The system is also capable of self adaptation of distributed resources to align with more efficient bandwidth, improved processing performance, and failed system nodes. Adaptation of reasoning strategies and the associated parameters can be performed which allows for flexibility and completeness of awareness states. Further, the system can learn over time to characterize both steady state conditions as well as conditions that are indicative of an anomaly or threat.

The system can incorporate simulation components that are used for incident theory extrapolation and confidence reinforcement. Simulation templates are established a priori and are triggered when the template parameters are fulfilled within some threshold window. The templates are then used to direct a selected simulation component to extrapolate the known facts and predict the outcomes at variant stages. The simulation may also be human guided and will support the "what if" forecasts during the tracking of an event or potential event.

The present system can be configured as an intelligent system which leverages artificial intelligence methodologies to present complicated information in a way that humans can rapidly interpret, understand and act upon with high levels of situational awareness. As an adaptive associate system, the present system can support reasoning with uncertainty to build counter-terror awareness and provide preemptive plans and coordinate routing and communications with first responders. The present system can provide an autonomous capability to preempt terrorist threats by aggregating and analyzing data, searching for patterns indicative of unfolding terror situations, then predicting and generating preemptive counter-measures to terror-based situations.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A network system for collecting information from sensors, comprising:
a plurality of different tier networks in communication with one another, each tier network comprising a plurality of network nodes one of which is configured as a command center of the tier network to collect data from other network nodes within the tier network and to direct the collected data to a center node of a superordinate tier network, the different tier networks configured to perform different and tier-specific data collection and data processing tasks and at least one tier network being located within a superordinate tier network; and a plurality of sensors spatially distributed in the different tier networks to perform sensing measurements, each sensor in communication with a respective network node to direct data of sensing measurements to the respective network node, each command center in a tier network comprises a database to store data in the tier network, a situation awareness module to provide event detection, event forecasting, assessment and response, an analytic module to analyze data characteristics, and a communication module to provide communications with adjacent subordinate and superordinate tier networks.

2. The system as in claim 1, wherein:
the different tier networks comprise:
a plurality of subordinate tier networks at different geographic regions, respectively;
a first tier network that is superordinate to the plurality of subordinate tier networks and encompasses at least a first subordinate tier network in the plurality of subordinate tier networks; and
a second tier network of a same tier ranking with the first higher tier network to encompass at least a second subordinate tier network in the plurality of subordinate tier networks.

3. The system as in claim 2, wherein:
the different tier networks comprise a third tier network that is superordinate to and encompasses the first and the second tier networks, the third tier network comprising a third command center in communication with a first command center in the first tier network and a second command center in the second tier network.

4. The system as in claim 1, wherein:
the different tier networks comprise:
a plurality of subordinate tier networks are differentiated from one another based on non-geographic network attributes.

5. The system as in claim 4, wherein:
one of the plurality of subordinate tier networks is a network of credit card computer servers or a network of other financial record computer database network.

6. The system as in claim 4, wherein:
one of the plurality of subordinate tier networks is a network of automatic teller machines.

7. The system as in claim 4, wherein:
one of the plurality of subordinate tier networks is a wireless mobile communication network.

8. The system as in claim 4, wherein:
one of the plurality of subordinate tier networks is an on-line service computer server network.

9. The system as in claim 1, comprising:
two different tier networks share one or more common network nodes while other network nodes in the two different tier networks are different.

10. The system as in claim 1, comprising:
a processing mechanism to distribute data processing to the plurality of different tier networks and to produce a response based on the distributed data processing.

11. The system as in claim 10, wherein:
the processing mechanism is adaptive to a history of responses of the system.

12. The system as in claim 10, wherein:
the processing mechanism comprises a neural network processing logic.

13. The system as in claim 10, wherein:
the processing mechanism comprises a fuzzy logic processing mechanism.

14. The system as in claim 10, wherein:
the sensors include sensors to detect a security threat and the processing mechanism produces a response to a confirmed security threat.

15. The system as in claim 14, wherein:
one or more tier networks in the plurality of different tier networks include network nodes at locations different from roadway intersections.

16. The system as in claim 15, wherein:
one or more tier networks in the plurality of different tier networks include network nodes at border checkpoints.

17. The system as in claim 15, wherein:
one or more tier networks in the plurality of different tier networks include network nodes at airport security checkpoints.

18. The system as in claim 15, wherein:
one or more tier networks in the plurality of different tier networks include network nodes at building or facility security checkpoints.

19. The system as in claim 15, wherein:
one or more tier networks in the plurality of different tier networks include network nodes at waterway security checkpoints.

20. The system as in claim 15, wherein:
one or more tier networks in the plurality of different tier networks include network nodes at railroad security checkpoints.

21. The system as in claim 10, comprising:
an artificial episodic memory mechanism in storing data in the plurality of different tier networks, and
wherein the processing mechanism is configured to perform data processing based on the artificial episodic memory mechanism.

22. The system as in claim 10, wherein:
the plurality of different tier networks includes databases that store historic event scenarios, and
the processing mechanism is configured to perform data processing in part based on the stored historic event scenarios.

23. The system as in claim 1, wherein:
the sensors include at least one or more sensors that detect at least one of a target chemical material, a target biological material, a target radiological material, a target nuclear material, and a target explosive material.

24. The system as in claim 1, wherein:
the communication module in each command center in a tier network comprises a communication mechanism to link the command center to one or more databases or systems outside the system to retrieve information outside the system into the system for data collection and processing.

25. The system as in claim 1, wherein:
each command center in a tier network comprises an user interface to allow a person to interact with the system.

26. The system as in claim 1, wherein:
each of the plurality of different tier networks is configured to operate independently and autonomously with respect to one or more other tier networks that are subordinate or equal in tier ranking.

27. The system as in claim 1, wherein:
a command center in each of the plurality of different tier networks is configured to directly communicate with a node in the respective tier network and in one or more other tier networks that are subordinate in tier ranking to the respective tier network.

28. A network system for collecting information from sensors, comprising:
a plurality of different tier networks in communication with one another, each tier network comprising a plurality of network nodes one of which is configured as a command center of the tier network to collect data from other network nodes within the tier network and to direct the collected data to a center node of a superordinate tier network, the different tier networks configured to perform different and tier-specific data collection and data processing tasks and at least one tier network being located within a superordinate tier network;
a plurality of sensors spatially distributed in the different tier networks to perform sensing measurements, each sensor in communication with a respective network node to direct data of sensing measurements to the respective network node; and
a processing mechanism to distribute data processing to the plurality of different tier networks and to produce a response based on the distributed data processing,
wherein:
the sensors include sensors to detect a security threat and the processing mechanism produces a response to a confirmed security threat;
one or more tier networks in the plurality of different tier networks include network nodes at roadway intersections;
the sensors include automatic license plate recognition sensors to obtain data on vehicle license plates; and
the response produced by the processing mechanism includes controlling traffic controllers to alter traffic routes at one or more locations.

29. The system as in claim 28, wherein:
the different tier networks comprise:
a plurality of subordinate tier networks at different geographic regions, respectively;
a first tier network that is superordinate to the plurality of subordinate tier networks and encompasses at least a first subordinate tier network in the plurality of subordinate tier networks; and
a second tier network of a same tier ranking with the first higher tier network to encompass at least a second subordinate tier network in the plurality of subordinate tier networks.

30. The system as in claim 29, wherein:
the different tier networks comprise a third tier network that is superordinate to and encompasses the first and the second tier networks, the third tier network comprising a third command center in communication with a first command center in the first tier network and a second command center in the second tier network.

31. The system as in claim 28, wherein:
the different tier networks comprise:
a plurality of subordinate tier networks are differentiated from one another based on non-geographic network attributes.

32. The system as in claim 31, wherein:
one of the plurality of subordinate tier networks is a network of credit card computer servers or a network of other financial record computer database network.

33. The system as in claim 31, wherein:
one of the plurality of subordinate tier networks is a network of automatic teller machines.

34. The system as in claim 31, wherein:
one of the plurality of subordinate tier networks is a wireless mobile communication network.

35. The system as in claim 31, wherein:
one of the plurality of subordinate tier networks is an on-line service computer server network.

36. The system as in claim 28, comprising:
two different tier networks share one or more common network nodes while other network nodes in the two different tier networks are different.

37. The system as in claim 28, wherein:
the processing mechanism is adaptive to a history of responses of the system.

38. The system as in claim 28, wherein:
the processing mechanism comprises a neural network processing logic.

39. The system as in claim 28, wherein:
the processing mechanism comprises a fuzzy logic processing mechanism.

40. The system as in claim 28, wherein:
one or more tier networks in the plurality of different tier networks include network nodes at locations different from roadway intersections.

41. The system as in claim 40, wherein:
one or more tier networks in the plurality of different tier networks include network nodes at border checkpoints.

42. The system as in claim 40, wherein:
one or more tier networks in the plurality of different tier networks include network nodes at airport security checkpoints.

43. The system as in claim 40, wherein:
one or more tier networks in the plurality of different tier networks include network nodes at building or facility security checkpoints.

44. The system as in claim 40, wherein:
one or more tier networks in the plurality of different tier networks include network nodes at waterway security checkpoints.

45. The system as in claim 40, wherein:
one or more tier networks in the plurality of different tier networks include network nodes at railroad security checkpoints.

46. The system as in claim 28, comprising:
an artificial episodic memory mechanism in storing data in the plurality of different tier networks, and
wherein the processing mechanism is configured to perform data processing based on the artificial episodic memory mechanism.

47. The system as in claim 28, wherein:
the plurality of different tier networks includes databases that store historic event scenarios, and
the processing mechanism is configured to perform data processing in part based on the stored historic event scenarios.

48. The system as in claim 28, wherein:
the plurality of different tier networks includes databases that store event scenario simulation data, and
the processing mechanism is configured to perform data processing in part based on the stored event scenario simulation data.

49. The system as in claim 28, wherein:
the sensors include at least one or more sensors that detect at least one of a target chemical material, a target biological material, a target radiological material, a target nuclear material, and a target explosive material.

50. The system as in claim 28, wherein:
each command center in a tier network comprises an user interface to allow a person to interact with the system.

51. The system as in claim 28, wherein:
each of the plurality of different tier networks is configured to operate independently and autonomously with respect to one or more other tier networks that are subordinate or equal in tier ranking.

52. The system as in claim 28, wherein:
a command center in each of the plurality of different tier networks is configured to directly communicate with a node in the respective tier network and in one or more other tier networks that are subordinate in tier ranking to the respective tier network.

53. The system as in claim 28, wherein:
each command center in a tier network comprises a database to store data in the tier network, a situation awareness module to provide event detection, event forecasting, assessment and response, an analytic module to analyze data characteristics, and a communication.

54. A network system for collecting information from sensors, comprising:
a plurality of sensors spatially distributed in a region of interest to perform sensing measurements;
a plurality of sensor communication nodes, each sensor communication node in communication with at least one of the sensors to receive data from the at least one sensor;
communication links that link the sensor communication nodes into a plurality of tier networks of sensor communication nodes based on geographic location attributes and non-geographic location attributes, the plurality of tier networks being configured to perform different data collection and data processing tasks based on the tier network attributes; and
a processing mechanism to distribute data processing to the plurality of tier networks and to produce a response based on the distributed data processing,
wherein:
the plurality of different tier networks includes databases that store event scenario simulation data, and
the processing mechanism is configured to perform data processing in part based on the stored event scenario simulation data.

55. The system as in claim 54, wherein:
the processing mechanism is adaptive to a history of responses of the system.

56. The system as in claim 54, wherein:
the processing mechanism comprises a neural network processing logic.

57. The system as in claim 54, wherein:
the processing mechanism comprises a fuzzy logic processing mechanism.

58. The system as in claim 54, wherein:
the sensors include sensors to detect a security threat and the processing mechanism produces a response to a confirmed security threat.

59. The system as in claim 54, comprising:
an artificial episodic memory mechanism in storing data in the plurality of tier networks, and
wherein the processing mechanism is configured to perform data processing based on the artificial episodic memory mechanism.

60. The system as in claim 54, wherein:
the plurality of tier networks includes databases that store historic event scenarios, and
the processing mechanism is configured to perform data processing in part based on the stored historic event scenarios.

61. The system as in claim 54, wherein:
the sensors include at least one or more sensors that detect at least one of a target chemical material, a target biological material, a target radiological material, a target nuclear material, and a target explosive material.

62. A network system for collecting information from sensors, comprising:
a plurality of sensors spatially distributed in a region of interest to perform sensing measurements;
a plurality of sensor communication nodes, each sensor communication node in communication with at least one of the sensors to receive data from the at least one sensor;
communication links that link the sensor communication nodes into a plurality of tier networks of sensor communication nodes based on geographic location attributes and non-geographic location attributes, the plurality of tier networks being configured to perform different data collection and data processing tasks based on the tier network attributes; and
a processing mechanism to distribute data processing to the plurality of tier networks and to produce a response based on the distributed data processing,
wherein:
the tier networks in the plurality of tier networks are configured as in a subordinate-superordinate relationship with one another, and
each tier network comprises a node as a tier command center which comprises:
a database to store data in the tier network,
a situation awareness module to provide event detection, event forecasting, assessment and response,
a analytic module to analyze data characteristics, and
a communication module to provide communications with adjacent subordinate and superordinate tier networks.

63. The system as in claim 62, wherein:
the communication module in each command center in a tier network comprises a communication mechanism to link the command center to one or more databases or systems outside the system to retrieve information outside the system into the system for data collection and processing.

64. The system as in claim 62, wherein:
each command center in a tier network comprises an user interface to allow a person to interact with the system.

65. The system as in claim 62, wherein:
each of the plurality of different tier networks is configured to operate independently and autonomously with respect to one or more other tier networks that are subordinate or equal in tier ranking.

66. The system as in claim 62, wherein:
a command center in each of the plurality of different tier networks is configured to directly communicate with a node in the respective tier network and in one or more other tier networks that are subordinate in tier ranking to the respective tier network.

67. The system as in claim 62, wherein:
the processing mechanism is adaptive to a history of responses of the system.

68. The system as in claim 62, wherein:
the processing mechanism comprises a neural network processing logic.

69. The system as in claim 62, wherein:
the processing mechanism comprises a fuzzy logic processing mechanism.

70. The system as in claim 62, wherein:

the sensors include sensors to detect a security threat and the processing mechanism produces a response to a confirmed security threat.

71. The system as in claim 62, comprising:

an artificial episodic memory mechanism in storing data in the plurality of tier networks, and wherein the processing mechanism is configured to perform data processing based on the artificial episodic memory mechanism.

72. The system as in claim 62, wherein:

the plurality of tier networks includes databases that store historic event scenarios, and the processing mechanism is configured to perform data processing in part based on the stored historic event scenarios.

73. The system as in claim 62, wherein:

the sensors include at least one or more sensors that detect at least one of a target chemical material, a target biological material, a target radiological material, a target nuclear material, and a target explosive material.

* * * * *